(12) United States Patent
Welbourne

(10) Patent No.: US 8,166,917 B2
(45) Date of Patent: May 1, 2012

(54) ANIMAL-ACTIVATED FLUID FLOW CONTROL SYSTEMS AND METHODS

(75) Inventor: Stephen B. Welbourne, Pittsfield, IL (US)

(73) Assignee: Welbourne Innovations, Inc., Pittsfield, IL (US)

( * ) Notice: Subject to any disclaimer, the term of this patent is extended or adjusted under 35 U.S.C. 154(b) by 1783 days.

(21) Appl. No.: 11/318,279

(22) Filed: Dec. 22, 2005

(65) Prior Publication Data

US 2006/0096546 A1 May 11, 2006

Related U.S. Application Data

(63) Continuation-in-part of application No. 10/613,840, filed on Jul. 5, 2003, now Pat. No. 6,981,469.

(51) Int. Cl.
*A01K 7/00* (2006.01)
*A01K 7/04* (2006.01)
*A01K 7/06* (2006.01)
(52) U.S. Cl. .............. 119/75; 119/72; 119/78; 119/80
(58) Field of Classification Search .......... 119/72, 119/72.5, 74–81
See application file for complete search history.

(56) References Cited

U.S. PATENT DOCUMENTS

| | | |
|---|---|---|
| 2,600,103 A | 6/1952 | Feck |
| 2,678,630 A | 5/1954 | Frederiksen |
| 2,790,417 A | 4/1957 | Brembeck |
| 3,505,978 A * | 4/1970 | Nilsen ............... 119/75 |
| 3,527,193 A | 9/1970 | Smith |
| 3,550,560 A | 12/1970 | Edstrom |
| 3,812,823 A | 5/1974 | Ridder et al. |
| 3,868,926 A | 3/1975 | Olde |
| 3,941,094 A * | 3/1976 | Nilsen, Jr. ............... 119/80 |
| 3,946,703 A | 3/1976 | Wheat |
| 4,047,503 A | 9/1977 | Wilmot |
| 4,089,350 A | 5/1978 | Gustin |
| 4,117,555 A | 10/1978 | Dennis |
| 4,138,967 A | 2/1979 | Tamborrino |
| 4,149,491 A | 4/1979 | Martin |
| 4,187,804 A | 2/1980 | von Taschitzki |
| 4,199,000 A | 4/1980 | Edstrom |
| 4,248,176 A | 2/1981 | Kilstofte |
| 4,258,666 A * | 3/1981 | Edstrom ............... 119/72.5 |

(Continued)

FOREIGN PATENT DOCUMENTS

EP 0406607 1/1991

(Continued)

*Primary Examiner* — David Parsley
(74) *Attorney, Agent, or Firm* — Dascenzo Intellectual Property Law, P.C.

(57) ABSTRACT

Animal-activated feeding systems and methods. The systems include a self-sealing valve assembly that, responsive to activation of a feed-flow activation member by an animal, selectively delivers a flow of the liquid feed to a vessel for consumption by the animal. The valve body further includes a valve member, which is configured to selectively obstruct the feed flow path, and a feed-flow activation member coupled to the valve member. The feed-flow activation member and valve member are selectively positionable between at least a sealed position and a range of activated positions. The valve assembly may include a buoyant activation restriction member adapted to restrict at least further or subsequent activation of the valve assembly responsive to the level of liquid feed in the vessel. The valve assembly may be configured to dispense the feed in a confined stream and/or in a generally horizontal or lateral direction into the vessel.

24 Claims, 7 Drawing Sheets

U.S. PATENT DOCUMENTS

| | | |
|---|---|---|
| 4,282,831 A | 8/1981 | Nilsen |
| 4,307,682 A | 12/1981 | Bollman |
| 4,320,891 A | 3/1982 | Cairns |
| 4,370,948 A | 2/1983 | Atkins |
| 4,394,847 A | 7/1983 | Langenegger et al. |
| 4,397,266 A | 8/1983 | Noland et al. |
| 4,402,343 A | 9/1983 | Thompson et al. |
| 4,416,221 A | 11/1983 | Novey |
| 4,444,149 A | 4/1984 | Shomer |
| 4,450,789 A | 5/1984 | Nilsen et al. |
| 4,471,722 A | 9/1984 | Dube et al. |
| 4,538,791 A | 9/1985 | Wostal |
| 4,539,938 A | 9/1985 | Maranell et al. |
| 4,559,905 A | 12/1985 | Ahrens |
| 4,656,970 A | 4/1987 | Hostetler |
| 4,757,784 A | 7/1988 | Hammer |
| 4,779,571 A | 10/1988 | Row |
| 4,819,585 A | 4/1989 | Dolan et al. |
| 4,892,061 A | 1/1990 | Steudler, Jr. |
| 4,922,858 A | 5/1990 | Ahrens |
| 5,003,927 A | 4/1991 | Thompson |
| 5,036,800 A | 8/1991 | Lischka |
| 5,065,700 A | 11/1991 | Cross |
| 5,070,817 A | 12/1991 | Momont |
| 5,115,764 A | 5/1992 | Soppe |
| 5,154,138 A | 10/1992 | Siddiqui et al. |
| 5,456,210 A | 10/1995 | Miller |
| 5,839,466 A * | 11/1998 | Dutter .......................... 137/414 |
| 6,003,468 A | 12/1999 | Edstrom, Sr. et al. |
| 6,073,584 A | 6/2000 | Schumacher |
| 6,279,508 B1 | 8/2001 | Marchant et al. |
| 2005/0221166 A1 | 10/2005 | Jones et al. |

FOREIGN PATENT DOCUMENTS

| | | |
|---|---|---|
| EP | 0554884 | 8/1993 |
| GB | 2134765 | 8/1984 |

\* cited by examiner

ANIMAL-ACTIVATED FLUID FLOW CONTROL SYSTEMS AND METHODS

RELATED APPLICATIONS

The present application is a continuation-in-part application of, and claims priority to and the benefit of, U.S. patent application Ser. No. 10/613,840, which was filed on Jul. 5, 2003, now U.S. Pat. No. 6,981,469, and which claims priority to U.S. patent application Ser. No. 10/128,223, and U.S. Provisional Patent Application Ser. No. 60/404,001. The present application also claims priority to, and the benefit of, International Patent Application Serial No. PCT/US2004/021438, which was filed on Jul. 3, 2004, which designates the United States, and which claims priority to U.S. patent application Ser. No. 10/613,840 and U.S. Provisional Patent Application Ser. No. 60/540,969. The complete disclosures of the above-identified patent applications are hereby incorporated by reference herein for all purposes.

FIELD OF THE INVENTION

The present disclosure relates to animal-activated systems and methods for controlling fluid flow to animals, and more particularly to systems and methods comprising means for accepting fluid from a source supply, then selectively ejecting said fluid into a vessel in which the liquid is presented for drinking by an animal. The disclosed systems find application in methodology for the liquid feeding of animals, such as (but not limited to) piglets.

BACKGROUND OF THE DISCLOSURE

Particularly in the last decade, supplemental feeding of piglets with a liquid feed has become increasingly popular as a supplement to, or even as a replacement to, sow feeding. Supplemental feeding of piglets can be practiced in addition to sow feeding by isolating a liquid feeder away from the sow, and it has been found that with the aide of a liquid feeder piglets can be weaned as soon as two days after birth. Supplemental feeding has additionally proven to provide other potential benefits, such as production of stronger, healthier piglets of increased early weight, along with a reduced death rate.

There are presently cup-based liquid feeders available in the marketplace, use of which has demonstrated proven utility. Most such cup-based liquid feeders incorporate what is termed an Edstrom liquid feeder system. While performing the basic function required thereof, Edstrom liquid feeders demonstrate inefficiencies which innovation in system design could eliminate.

SUMMARY OF THE DISCLOSURE

The present disclosure is directed to animal-activated fluid flow control systems, or animal-activated feeding systems, that are adapted to dispense a liquid feed to a vessel from which an animal may drink or otherwise consume the liquid feed. Animal-activated feeding systems according to the present disclosure include a self-sealing valve assembly. The valve assembly is adapted to deliver, responsive at least in part to activation of a feed-flow activation member by an animal, a flow of the liquid feed, such as to a cup, trough, container or other vessel from which an animal may drink the liquid feed, and is selectively configurable between a sealed configuration and a dispensing configuration. The valve assembly is biased to the sealed configuration.

The valve assembly includes a valve body and defines a feed flow path that includes an inlet feed flow path, which includes an inlet that is configured to receive the liquid feed from a feed source. The feed flow path further includes an outlet feed flow path, which includes an outlet that is configured to dispense the liquid feed to the vessel. The valve assembly may be adapted to dispense the liquid feed in a confined stream to the vessel. The valve body further includes, or houses, a valve member, which is configured to selectively obstruct the feed flow path, and a feed-flow activation member that is coupled to the valve member. The feed-flow activation member may be configured to be upwardly extending from the valve body, such as generally away from a bottom surface of the vessel. The feed-flow activation member and valve member may be configured to be selectively positioned between at least a sealed position and a range of activated positions. In the sealed configuration of the valve assembly, the valve member is positioned in the sealed position to prevent, or otherwise restrict, feed from flowing through the feed flow path. In the dispensing configuration of the valve assembly, the valve member is positioned within the range of activated positions to permit a flow of feed to pass through the feed flow path.

In some embodiments, the valve assembly includes a buoyant activation restriction member that is adapted to restrict at least further or subsequent activation of the valve assembly responsive to the level of liquid feed in the vessel. In some embodiments, the valve assembly is configured to dispense the feed in a generally horizontal or lateral direction into the vessel. In some embodiments, the outlet flow path has a central axis within a plane generally perpendicular to a central axis of the activation member when the activation member is in the sealed position. Methods of selectively dispensing liquid feed into a vessel are also disclosed, including methods for selectively enabling and/or restricting dispensing of liquid feed responsive to forces exerted by an animal.

DETAILED DESCRIPTION AND BEST MODE OF THE DISCLOSURE

Figure 1:
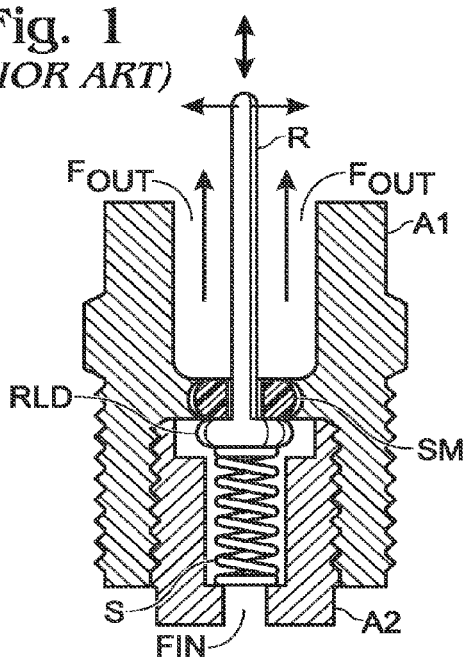
FIG. 1 is a cross-sectional side elevation view of a prior art fluid-feeder system.
Figure 2:
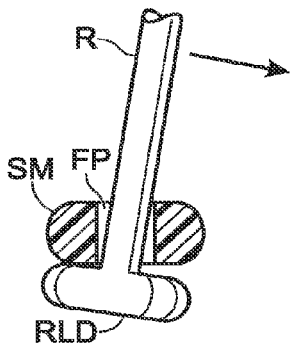
FIG. 2 is a schematic diagram of a cross-sectional side elevation view of a portion of the fluid-feeder system of FIG. 1.

Referring initially to FIGS. 1 and 2, there is shown a typical prior art fluid feeder system. Shown are basic structural elements (A1) and (A2), and a rod (R) with a substantially abrupt larger diameter near its lower aspect (RLD). Also shown are a seal (SM), and a spring (S) (shown as a coil in FIG. 1, but it is also known to use a functionally similar pliable soft mass of material), to maintain fluid sealing contact between the substantially abrupt larger diameter portion of the rod (R) and the seal (SM). In use, when the rod (R) is positioned to project substantially vertically as shown, no fluid can pass from an input (FIN) to an output (FOUT). However, when the rod (R) is caused to move off the shown vertical orientation (e.g., see arrows pointing to the right or left in FIG. 1), the seal (SM) allows fluid to pass through the flow path (FP) (see FIG. 2), from the input (FIN), through the seal (SM), and eject substantially laterally as fluid out (FOUT) as identified in FIG. 1.

Figure 3:
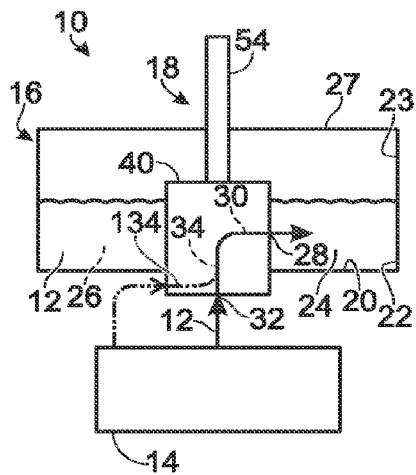
FIG. 3 is a schematic diagram of an animal-activated feeding system according to the present disclosure.

An animal-activated fluid flow control system, or animal-activated feeding system, according to the present disclosure is schematically illustrated in FIG. 3 and is generally indicated at 10. As shown, system 10 is configured to receive a liquid feed 12 from a feed source 14 and to selectively dispense the feed to a vessel 16 from which an animal may drink the feed. As discussed in more detail herein, the feeding system includes a self-sealing valve assembly 18. It is within the scope of the present disclosure that feeding system 10 may be sized and/or otherwise configured to provide liquid feed for a variety of types of animals. An illustrative, non-exclusive type of animal that may be fed by the feeding systems is pigs. However, the disclosed feeding systems are not limited to providing liquid feed only to pigs. Other illustrative examples include, but should not be required or limited to, sheep, various household pets, fowl, and the like. The feeding systems 10 disclosed herein additionally or alternatively may be described as being animal-activated liquid feed dispensing systems and/or as a laterally ejecting fluid flow control (or feeding) system.

Feed 12 may take any suitable liquid form and composition for consumption by an animal. For example, feed 12 may include, or be, water, a water-based solution, milk, a milk-based solution, a suitable liquid animal feed, a dairy substitute, a dairy substitute-based solution, etc. Feed 12 may, but is not required to, include suspended or dissolved solids. Accordingly, while feed 12 is described as a liquid feed, it is not required to be completely liquid. However, feed 12 should be sufficiently liquid to flow through the feeding systems, as described herein. In some embodiments, feed 12 may include nutritional and/or dietary supplements, or additives, and/or medications. The particular composition of feed 12 to be used with a feeding system according to the present disclosure may vary, such as according to one or more of such illustrative non-exclusive factors as the type of animal that will be consuming the feed, the age of the animal, the desired nutritional content of the feed, the desired concentration of the feed, other sources of food that are provided to the animal, the health of the animal, the climate in which the system will be used, the desired use of the animal, user preferences, etc.

Feed source 14 generally refers to any suitable source, or supply, from which feed 12 may be delivered to the valve assembly and thereafter selectively dispensed to a vessel 16 from which the animal may drink the feed. The feed source may be in fluid communication with only a single valve assembly 18, or it may be in fluid communication with a plurality of valve assemblies 18. Source 14 may be a pressurized source that contains a pressurized supply of feed 12. As another illustrative example, the source may include, or be otherwise associated with, a suitable pump or delivery mechanism that is adapted to deliver the feed to the valve assembly. Systems that are adapted to receive the feed via gravity flow, such as from a suitable source, are also within the scope of the present disclosure. Systems 10 may be adapted to receive (and feed sources 14 may be adapted to deliver) feed 12 at any suitable, or functional, pressure. Illustrative examples of functionally suitable pressures include pressures in the range of 5-50 psi. Additional non-exclusive examples of illustrative delivery pressures include pressures in the range of 30-40 psi, pressures in the range of 10-20 psi, pressures in the range of 20-30 psi, pressures of at least 30 psi (including 30-40 psi or 30-50 psi), pressures that are greater than 10-20 psi, a pressure of 20 psi, etc.

Vessel 16 may take any suitable shape, configuration, and/or size for receiving a flow of liquid feed 12 from the valve assembly and providing an open container from which an animal may drink the feed. Accordingly, vessel 16 should be configured to receive and retain, or hold, a volume of the liquid feed that is delivered thereto from the valve assembly and to present the feed for drinking by an animal, such as the animal that activated the feeding system. As somewhat schematically illustrated in FIG. 3, the vessel is depicted as including at least a bottom surface 20 and sidewalls 22 with interior surface 23 that define a reservoir region 24 of the vessel. The reservoir region of the vessel may be sized to hold up to a predetermined volume 26 of the liquid feed and to present, or position, the volume of feed for consumption by an animal. It is within the scope of the present disclosure that the cup or other vessel may have a configuration other than the rectilinear shape that is schematically illustrated in FIG. 3. While this configuration is within the scope of the present disclosure, it is also within the scope of the present disclosure that the walls and/or bottom surface may include curved regions, and/or that the vessel may include a curved, or sloped, transition region that interconnects the walls and bottom surface. The horizontal orientation, or perimeter, of the vessel may have any suitable shape and size, including circular, oval, polygonal, and other shapes, and may be sized for use by a single animal (at one time), or may be sized so that more than one animal may drink feed 12 from the reservoir simultaneously.

It is within the scope of the present disclosure that the vessel may be sized and/or otherwise configured for use by only one animal at a time or by two or more animals simultaneously. It is also within the scope of the present disclosure that a vessel 16 may be sized or otherwise configured to receive liquid feed 12 from only a single valve assembly 18 or to receive liquid feed from two or more valve assemblies. In some embodiments, the vessel may take the form of a cup, or container, that defines a localized reservoir of liquid feed, while in other embodiments, the vessel may have an elongate configuration, such as by taking the form of a trough, tray, or similar structure. For example, vessels 16 according to the present disclosure may, but are not required to, include at least one opening 27, such as an upper and/or lateral opening through which an animal's head may extend to drink liquid from the vessel. Additionally or alternatively, the vessel, or cup, as viewed in side elevation, may be described as being generally open at the top thereof, having substantially vertically projecting side(s), and a bottom that is substantially closed except for an opening for receiving the valve assembly. The valve assembly may be generally, or substantially, tubular in shape and may vertically project through the bottom of the vessel, or cup, in which it is secured. The housing of the valve assembly may have any suitable shape, including shapes having circular cross-sectional configurations, but this configuration is not required to all embodiments. The valve assembly's body should be adapted to define a fluid conduit, or flow path, extending therethrough, with the valve assembly being adapted to selectively restrict the flow of feed therethrough.

A system 10 may be adapted to provide a means for ejecting, or at least one outlet 28 adapted to eject the feed, or other fluid, 12 into the vessel, or other cup. The outlet(s) or means for ejecting may be adapted to eject the liquid feed laterally into the vessel along a substantially horizontal locus or loci, and may define at least a portion of at least one outlet flow path 30. Stated in slightly different terms, the valve assembly may be adapted to eject fluid, or feed, 12 substantially laterally into the vessel generally without a substantial upward or downward component to the trajectory at which the liquid feed is ejected from the outlet(s). In other words, outlet(s) 28 may define outlet flow path(s) 30 and may be configured to dispense the feed in a confined, or discrete, stream into the vessel. Further, system 10 may be adapted to provide a means for accepting, or an inlet 32 that is adapted to accept, fluid from the feed source. The inlet may be adapted to accept fluid entered thereinto along a substantially vertically oriented locus, or inlet flow path 34, and may be configured to receive feed 12 from feed source 14. In other words, in some embodiments of systems 10 according to the present disclosure, the outlet flow path is generally perpendicular to the inlet flow path. However, it is within the present disclosure that the inlet flow path may be other than generally vertical. For example, as generally indicated by the dash-dot-dot line at 134 in FIG. 3, the inlet flow path may be generally horizontal, while the outlet flow path is also generally horizontal.

Figure 4:
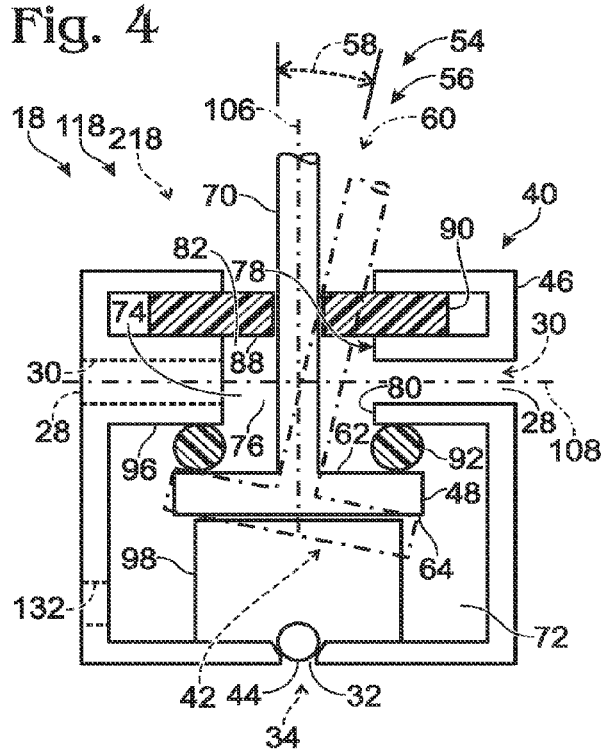
FIG. 4 is a schematic diagram of a cross-sectional side elevation view of a valve assembly for use in animal-activated feeding systems according to the present disclosure.

Referring now to FIG. 4, an illustrative, non-exclusive example of valve assembly 18 is schematically illustrated. Valve assembly 18 includes a valve body, or housing, 40 that defines a feed flow path 42, comprising the inlet flow path 34 and the outlet flow path 30, through which feed 12 may selectively flow through the valve body. Valve body 40 may additionally or alternatively be described as a nipple housing. As discussed and schematically illustrated, valve body 40 includes inlet, or inlet port, 32 that is configured to receive feed from the feed source, and outlet or outlets, or outlet port or ports, 28 that are configured to dispense feed to the vessel. Inlet 32 may comprise at least one hole or other suitable aperture, which may, but is not required to be, functionally sealed with a pressure operated back-flow preventing plug means, or check valve, 44 until feed 12 presents sufficient pressure on the check valve to effect feed, or fluid, entry through the hole. In embodiments incorporating a check valve, check valve 44 may take any suitable configuration or structure such that check valve 44 is adapted to generally prevent, or at least greatly restrict, the flow of feed from within valve body 40 through inlet 32 and toward feed source 14.

Valve body 40 may include at least one laterally facing hole or other suitable aperture (i.e., outlet or outlets 28) through an essentially vertical projection, or side, 46 of valve body 40, such as at a vertical location below the vertical level of the top of the vessel and above the vertical level of the bottom of the vessel. In the illustrative, non-exclusive embodiment shown in FIG. 4, only one outlet is depicted; however, it is within the scope of the present disclosure that any suitable number of outlets 28 may be utilized.

Valve assembly 18 further includes a valve member 48 that is configured to selectively obstruct the feed flow path 42 and thereby prevent liquid feed from flowing through the feed flow path from the feed source, through the valve assembly, and to the vessel. The inlet, the feed flow path, the valve member, and the outlet may have any suitable individual and/or relative configuration and orientation. In the illustrative example shown, these components are depicted as being coaxially oriented, but this configuration is not required in all embodiments. For example, and as discussed, the inlet of the valve assembly may be positioned in any suitable orientation relative to the valve body and the feed flow path. As another graphical example, inlet 32 is shown in dashed lines at 132 positioned on the side of the valve body.

Valve assembly 18 also includes a feed-flow activation member 54 that is rigidly or otherwise suitably coupled to valve member 48 to configure the valve member to be selectively positioned relative to the valve body responsive to movement of the activation member. The activation member is adapted to be selectively positioned between at least a sealed position 56 and a range of activated, or dispensing, positions 58. An illustrative, non-exclusive example of a suitable activation member 54 is schematically shown and graphically depicted in two pivotal positions that correspond to a sealed position and an activated position of a range of activated positions of the activation member. It is within the scope of the present disclosure that an activation member 54 may also be selectively configured within a range of sealed positions in addition to a range of activated positions. It is also within the scope of the present disclosure that the activation member is additionally or alternatively configured for movement other than pivotal movement as it is configured between its sealed and activated positions. For example, it is within the scope of the present disclosure that the activation member, and optionally valve member 48, may additionally or alternatively be configured for translational movement (such as lateral movement) and/or vertical movement (such as generally toward the inlet, as depicted in solid lines in FIG. 4). As used herein, an activated position of the activation member (and/or a corresponding valve member) corresponds to a configuration in which the valve member is positioned so that liquid feed may flow through the feed flow path from the valve assembly's inlet to its outlet or outlets. As used herein, a sealed position of the activation member (and/or its corresponding valve member) corresponds to a configuration in which the valve member is positioned so that liquid feed is restricted or otherwise prevented from flowing through the feed flow path from the valve assembly's inlet to its outlet or outlets, such as a position in which the valve member obstructs the flow of liquid feed through the feed flow path.

The combination of valve member 48 and activation member 54 may additionally or alternatively be referred to herein as a rod means 60. As such, the rod means may be described as being substantially of one diameter over the majority of its length (i.e., the activation member), and may have a substantially abrupt larger diameter near its lower aspect (i.e., the valve member). The substantially abrupt larger diameter portion (or valve member) may have an upper surface 62 and a lower surface 64. Thus, as discussed, rod means 60 may be positioned in valve assembly 18 for providing fluid to vessel, or cup, 16 such that the rod means projects substantially vertically or upwardly out of the valve body, or nipple housing, and is accessible from atop the vessel. The rod means, or activation member, may (but is not required to) have a cylindrical and/or elongate configuration, and may (but is not required to) be configured for substantially, or exclusively, pivotal or lateral movement relative to the valve body.

In the illustrated example, the activation member is schematically illustrated extending upwardly from the valve body and generally away from the bottom surface 20 of vessel 16. However, these illustrative configurations are not required for all feeding systems according to the present disclosure. Regardless of its particular orientation, activation member 54 extends generally away from the valve member and is adapted to transmit forces, such as forces imparted by the animal that is activating the valve assembly, to the valve member, such as to configure the valve member from a sealed position to a dispensing position. In some embodiments, such as illustrated in FIG. 4, the activation member may project or otherwise extend from valve body 40, such as extending generally upwardly from the valve assembly and/or away from a lower surface of the vessel 16 into which feed 12 is selectively dispensed by the valve assembly.

Activation member 54 may be configured to be pivotally or otherwise actuated directly or indirectly by an animal utilizing the feeding system. In some embodiments, the animal utilizing the feeding system will directly engage and push upon the activation member to urge the activation member away from a sealed position to an activated position. In some embodiments, the animal will additionally or alternatively engage and push upon another portion of the feeding system, such as an attachment to the activation member, to urge the activation member away from a sealed position to an activated position. Typically, an animal utilizing the feeding system will push against the activation member with the animal's head, such as its nose, mouth, snout, and the like. For example, a piglet or other pig utilizing the feeding system may use its snout to urge the valve assembly to an activated position. In embodiments where activation member 54 is directly actuated by an animal, activation member 54 may take any suitable form, shape, size, and/or length that configures the activation member for engagement by the animal to urge the activation member (and the corresponding valve member) to an activated position. Activation member 54 may have an outer surface 70 adapted specifically for actuation by a particular type of animal. For example, outer surface 70 may be sized and/or otherwise adapted to receive actuation by (i.e., have actuating forces or pressure applied thereto by) the snout of a pig or piglet. Systems 10 for use with adult pigs, for example, may have a longer activation member 54 than systems 10 for use with piglets. Accordingly, the activation member, or rod means, should be sized to project sufficiently far out of the valve body, or nipple housing, to present an engagement region of the activation member for receipt of orientation-changing pressure that is applied by an animal. It is within the scope of the present disclosure that system 10 may be adapted for application to other animals as well, with sheep, household pets, cows, and various fowl providing other illustrative, non-exclusive examples.

When an animal activates, or actuates, the activation member, valve member 48 is positioned to permit feed to flow from inlet 32 to outlet or outlets 28 by way of feed flow path 42. When the activation member is in a sealed position (as depicted in solid lines in FIG. 4), the valve assembly may be described as being in a sealed configuration 118, and when the activation member is in an activated position (as depicted in dash-dot-dot lines in FIG. 4), the valve assembly may be described as being in a dispensing, or activated, configuration 218. It is within the scope of the present disclosure that the flow rate of feed 12 through the valve assembly may increase as the activation member is pivoted or otherwise moved away from a sealed position. In such an embodiment, an activated position further from the sealed position may produce a greater flow rate of feed than an activated position closer to the sealed position. This relative increase in flow rate may be, but is not required to be, linearly or otherwise correlated with the range of activated positions. However, it is also within the scope of the present disclosure that the valve assembly is configured to produce a constant flow rate of feed through the feed flow path regardless of which of the activated positions in which the activation member is positioned.

As shown in FIG. 4, valve bodies 40 according to the present disclosure may, but are not required to in all embodiments, include an inlet cavity 72 and an outlet cavity 74 that are in fluid communication with each other, such as by being fluidly connected by a first passage 76. In such embodiments, feed flow path 42 is defined by at least inlet 32, inlet cavity 72, first passage 76, outlet cavity 74, and outlet or outlets 28. In some embodiments, valve body 40 may be described as including a first diameter reducing restriction 78, which generally defines a second passage 82 and an upper extent 88 of outlet cavity 74. Valve body 40 may further be described as including a second diameter reducing restriction 80, which generally defines first passage 76 and separates inlet cavity 72 and outlet cavity 74. As discussed, outlet or outlets 28 define(s) outlet path(s) 30, which is/are oriented generally horizontal and preferably generally perpendicular to inlet path 34.

Valve assemblies 18 according to the present disclosure may, but are not required to, include a first sealing mechanism, or sealing means, 90 and a second sealing mechanism, or sealing means, 92, such as schematically illustrated in FIG. 4. First sealing mechanism 90 may be associated with first diameter reducing restriction 70 (or second passage 82), while second sealing mechanism 92 may be associated with second diameter reducing restriction 80 (or first passage 76). First sealing mechanism 90 may be configured to generally prevent, or at least greatly restrict, flow of feed from outlet cavity 74 generally upward along the direction of activation member 54, irrelevant of the positioning of activation member 54. First sealing mechanism 90 may include a lower surface 94, which may define upper extent 88 of outlet cavity 74 and be configured to generally deflect feed flow path 42 laterally along outlet path or paths 30 and out of outlet or outlets 28 into vessel 16. First sealing mechanism 90 may take any suitable configuration or structure for accomplishing such functions. For example, in the illustrative non-exclusive embodiment schematically illustrated in FIG. 4, first sealing mechanism 90 may slide generally horizontal relative to valve body 40, such that when activation member 54 is positioned from the sealed position to within the range of activated positions, first sealing mechanism 90 maintains its sealing function of generally preventing passage of feed 12 from outlet cavity 74 generally upward along the direction of activation member 54. However, it is within the present disclosure that first sealing mechanism 90 may be in the form of any suitable sealing structure and may include one or more components on the valve body and/or portion of the valve body. Accordingly, first sealing mechanism 90 may be configured to move with activation member 54, to remain in contact with activation member 54, to remain in contact with the valve body, and in some embodiments to move relative to the valve body. In other embodiments, first sealing mechanism 90 may generally not move relative to valve body 40, and instead may be compressible, or have another suitable characteristic, such that actuation of activation member 54 does not generally allow flow of feed to pass through first sealing mechanism 90 generally upward along the direction of activation member 54. As such, first sealing mechanism 90 may take a variety of forms including, but not limited to, a washer, or washers, an o-ring or o-rings, or other compressible sealing structure or structures, etc.

Second sealing mechanism 92 may be adapted to form a liquid seal between valve member 48 and valve body 40 such that feed 12 is prevented, or at least greatly restricted, from flowing through feed flow path 42 when the valve assembly is in a sealed configuration. In the illustrative schematic example shown in FIG. 4, second sealing mechanism 92 is positioned within inlet cavity 72 between upper surface 62 of valve member 48 and a surface 96 of inlet cavity 72 that encircles first passage 76. Second sealing mechanism 92 is adapted to aid or otherwise assist in obstructing the feed flow path when the activation member is in sealed position 56, thereby restricting the flow of feed when the valve assembly is in a sealed configuration. Second sealing mechanism 92 may be in the form of any suitable sealing structure and may include one or more components on the valve member and/or a portion of the valve member that is contacted by the valve member, such as inlet cavity 72. Accordingly, second sealing mechanism 92 may be configured to move with the valve member, to remain in contact with the valve body that is contacted by the valve member in its sealed position, or both. Illustrative, non-exclusive examples of suitable sealing structures include an o-ring, a gasket, a self-sealing coating, contoured sealing surfaces, or any other suitable liquid-sealing structure. In some embodiments of valve assemblies 18 according to the present disclosure, a sufficient liquid seal may be formed between surface 62 of valve member 48 and surface 96 of inlet cavity 72 without the addition of a separate sealing structure. Systems 10 may be additionally or alternatively described as including seal means that is adapted to prevent feed from leaking or otherwise being unintentionally dispensed from the system. The first and second sealing mechanisms may be respectively referred to as first and second, or upper and lower, seal means, although this is not a required or exclusive construction.

As schematically illustrated in FIG. 4, valve assemblies 18 according to the present disclosure may, but are not required to in all embodiments, also include a bias member 98 that is adapted to bias valve assembly 18 to the (or a) sealed configuration. As shown, bias member 98 may be retained within inlet cavity 72 such that the bias member biases valve member 48 (and/or activation member 54) to the sealed position and thus biases the valve assembly to the valve assembly's sealed configuration. Bias member 98 may include any suitable structure that is adapted to urge the activation member to a sealed position, such as sealed position 56, and such as by urging valve member 48 toward first passage 76. Bias member 98 may be positioned in any suitable position such that the bias member is configured or otherwise positioned to act, or otherwise exert forces, either directly or indirectly, on the activation member to bias the activation member to the sealed position. Illustrative, non-exclusive examples of suitable structures for bias member 98 include at least one spring, such as a helical or other coil spring and/or a leaf spring. Additional illustrative structures include resilient members and/or elastic members that are adapted to bias or otherwise urge the valve assembly to a sealed configuration. The structures utilized in bias member 98 may be configured in compression or in tension, as appropriate for the particular structure and/or position of the structure relative to the component of the valve assembly upon which it exerts restorative forces that urge the valve assembly to a sealed configuration.

It is also within the scope of the present disclosure that the valve member may be additionally or alternatively biased to a sealed configuration by the liquid feed upstream (i.e. toward inlet 32 relative to valve member 48) of the valve member. In some embodiments, this force may be sufficient to bias the valve assembly to a sealed configuration. The biasing force applied to the valve member should be sufficient to restrict liquid feed from leaking or otherwise flowing through the liquid feed path when the valve assembly is in a sealed configuration, while also not being so strong, or great, that the animal for which the animal-activated feeding system is designed for use cannot effectively urge the valve assembly from a sealed configuration to a dispensing configuration.

In the schematically depicted embodiment of FIG. 4, system 10 may function as follows: source fluid, or feed 12, is provided in contact with the back-flow preventing plug means, or check valve 44, at a sufficient pressure to cause the check valve to allow the feed entry into the nipple housing, or valve body 40, such that it contacts the lower surface 64 of the substantially abrupt larger diameter of the lower aspect of said rod means, or valve member 48. Further, when the activation member (by application of physical force by an animal, or otherwise, to its upper end that projects through first sealing mechanism 90, and out of valve body 40), is caused to project other than substantially vertically, the second sealing mechanism 92 is caused to allow fluid to pass vertically therethrough and thereafter be ejected from the outlet or outlets 28, the liquid feed being ejected into the vessel. As discussed, it is within the scope of the present disclosure that the valve assembly may be (but is not required to in all embodiments) eject the liquid feed at least substantially laterally into the vessel, such as substantially without an upward or downward component. It is noted that first sealing mechanism 90 continues to prevent substantially all fluid from flowing essentially vertically there-past during actuation of activation member 54.

Figure 5:
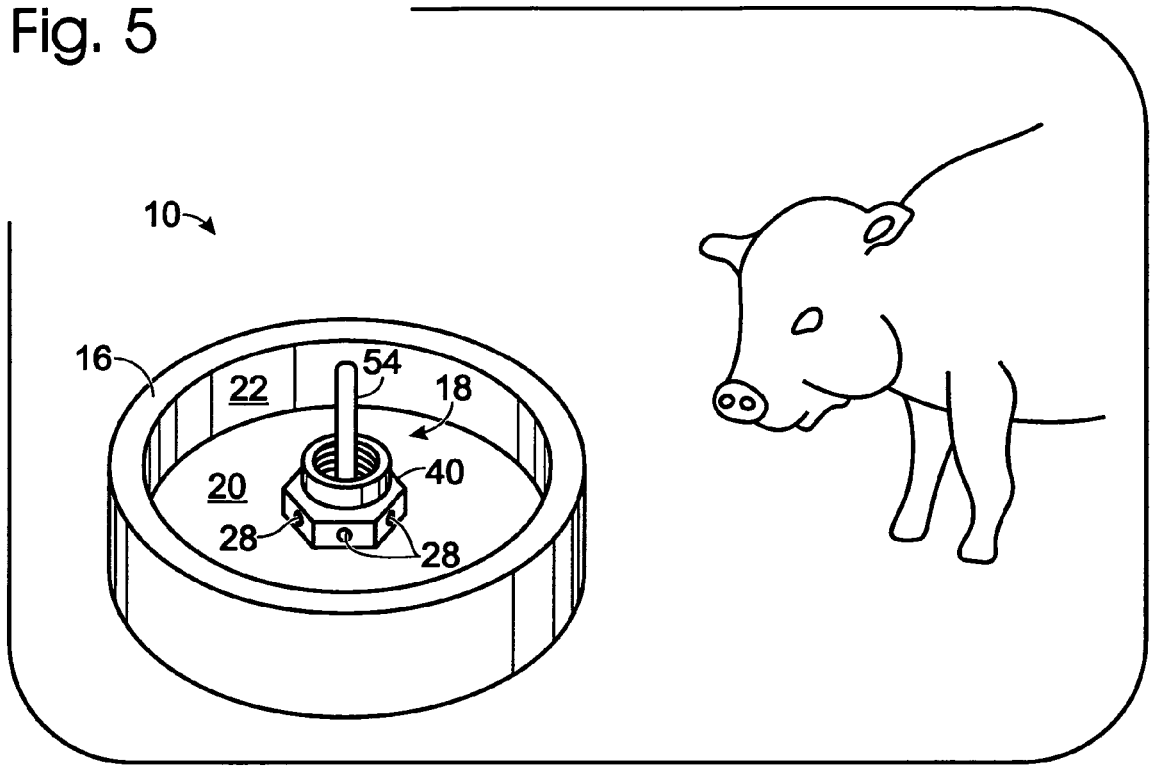
FIG. 5 is an illustration of an animal-activated feeding system according to the present disclosure depicted with an illustrative, non-exclusive example of an animal that may drink liquid feed dispensed by the animal-activated feeding system.

Valve assembly 18 may have any suitable combination of valve body 40, valve member 48, and activation member 54. Valve assembly 18 may include a bias member 98, and first and second sealing mechanisms 90 and 92. In FIG. 4, these components have been discussed and/or illustrated together, but it is within the scope of the present disclosure that they may be used in groups and/or all together. It is further within the scope of the present disclosure that the subsequently described and/or illustrated examples of these components may include any permissible one or more of the examples and/or variants described, illustrated and/or incorporated herein. Furthermore, it is within the scope of the present disclosure that the subsequently described and/or illustrated examples of other components, not discussed above, may be incorporated into embodiments of systems 10 as well. An illustrative, non-exclusive example of an animal-activated feeding system according to the present disclosure is depicted in FIG. 5 with an illustrative example of an associated animal, such as may drink liquid feed from the vessel.

Figure 6:
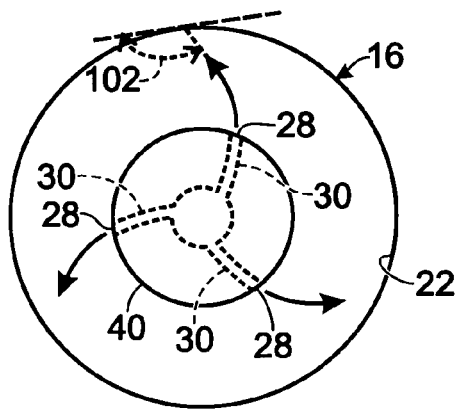
FIG. 6 is a schematic diagram of a cross-sectional plan view, taken along a plane generally bisecting the outlets, of an illustrative example of a valve body according to the present disclosure.
Figure 7:
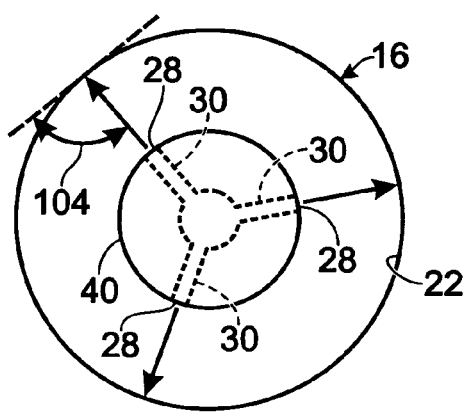
FIG. 7 is a schematic diagram of a cross-sectional plan view, taken along a plane generally bisecting the outlets, of another illustrative example of a valve body according to the present disclosure.

Referring now to FIGS. 6 and 7, cross-sectional plan views, taken along a plane generally bisecting outlets 28, of two illustrative, non-exclusive embodiments of valve body 40 are shown. As illustrated, the valve assemblies are positioned generally in the center of a vessel 16 with sidewall 22 with a generally circular cross-section. The depicted valve bodies include three outlets 28; however, as discussed, it is within the scope of the present disclosure that valve body 40 may include any suitable number of outlets 28, including one or two outlets, or more than three outlets. FIGS. 6 and 7 indicate lateral fluid, or feed, ejection along three non-radial, or arcuate, loci, or outlet flow paths 30, and along three radial, or generally straight, loci, or outlet flow paths 30, respectively. Stated differently, a means for ejecting feed into the vessel, or outlet flow paths 30, may be (but is/are not required to be) adapted to eject feed substantially laterally along a locus, or path, selected from the group consisting of at least one of a non-radial path, so as to direct the feed at sidewall 22 of a vessel 16 at a generally non-normal angle 102 (as shown in FIG. 6); and a radial path, so as to direct the feed at sidewall 22 of a vessel 16 at a generally normal angle 104 (as shown in FIG. 7). Both depicted illustrative (non-exclusive) embodiments are useful in that they impart an agitation to the feed in the vessel, which aids in preventing solids, or sludge, from settling out of feed 12 during use. While it is within the scope of the present disclosure that the valve assembly is adapted to dispense, or eject, liquid feed 12 at a lateral orientation and/or an orientation that is normal to the axis of the actuation member when the actuation member is in a sealed configuration, it is also within the scope of the present disclosure that the valve assembly may be adapted to dispense feed at somewhat inclined or declined orientations.

Referring back to FIG. 4, the lateral ejection of liquid feed by systems 10 according to the present disclosure may additionally or alternatively be described as follows: Feed flow activation member 54 may include a central axis 106 and outlet path or paths 30 may include a central axis or axes 108 within a plane generally perpendicular to central axis 106 of activation member 54 when the activation member is in the sealed position. As such, the embodiment of FIG. 6 includes outlet paths 30 that are generally arcuate, or non-radial, such that the outlet paths are adapted to direct the flow of feed at the sidewall 22 of vessel 16 at a generally non-normal angle 102. In the embodiment of FIG. 7, outlet paths 30 are generally straight, or radial, such that the outlet paths are adapted to direct the flow of feed at the sidewall 22 of vessel 16 at a generally normal angle 104. Other embodiments where the outlet path or paths direct the flow of feed at the sidewall of the vessel at a non-normal angle are also within the scope of the present disclosure. For example, central axis 108 of the outlet flow path or paths 30 may be generally offset from, and not intersect, central axis 106 of activation member 54 when the activation member is in the sealed position.

It is beneficial to note that the lateral ejection, when provided by systems 10, may prevent feed from being sprayed upward into the air. This includes preventing spray into the face of a piglet, or other animal, that actuates activation member 54. Such spray-action, as occurs in the prior art (see FIG. 1), wastes feed, may raise health concerns, and may even scare young piglets, or other animals, that are not used to animal-activated feeding systems. Further, as piglets, or other animals, grow older and become more active and playful, they may be tempted by the possibility of causing an upward spray, and therefore may over-activate a feeding system thereby preventing waste of feed. It is also noted that in summer heat, pigs or other animals may learn to cool themselves by causing a spray of liquid feed into the air in prior art systems, such as depicted in FIG. 1. System 10 according to the present disclosure serves to prevent feed from being wastefully ejected beyond the vessel, again thereby preventing pigs, or other animals, from wastefully ejecting feed from an animal-activated feeding system.

Figure 8:
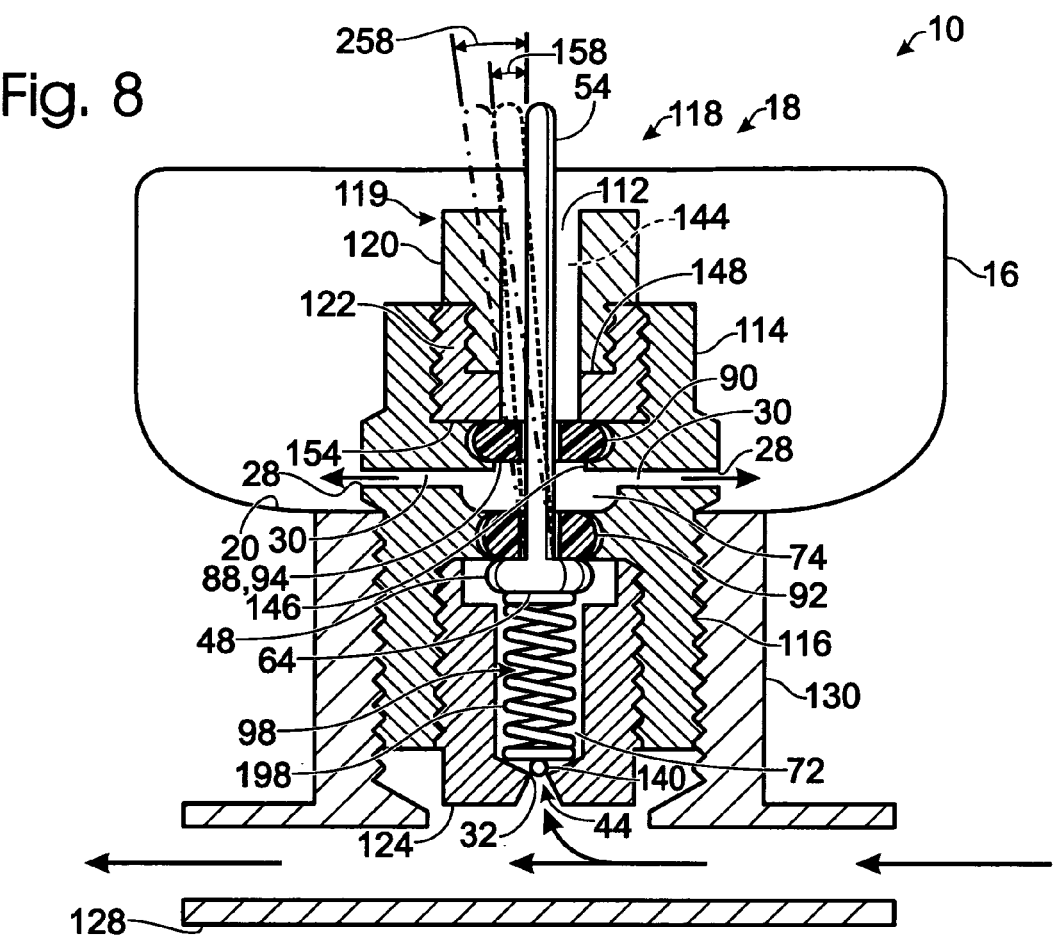
FIG. 8 is a cross-sectional side elevation view of an illustrative example of an animal-activated feeding system according to the present disclosure.

Turning now to FIGS. 8-12, somewhat less schematic views of additional illustrative non-exclusive embodiments of animal-activated feeding systems 10 according to the present disclosure are shown. In FIG. 8, system 10 is shown including valve assembly 18, vessel 16, and an associated feed supply line 128. As discussed, valve assembly 18 is adapted to be selectively configured between at least a sealed configuration 118 and a range of dispensing configurations. Valve assembly 18 is biased to the sealed configuration, such as by a suitable bias member. Further, as discussed, valve assembly 18 is adapted to laterally eject feed into vessel 16 via outlets 28, when valve assembly 18 is in a dispensing configuration. The depicted embodiments of FIGS. 8-12 are shown with at least two outlets in cross-section; however, as discussed, it is within the scope of the present disclosure that animal-activated feeding systems 10 according to the present disclosure may incorporate any suitable number of outlets 28.

Figure 9:
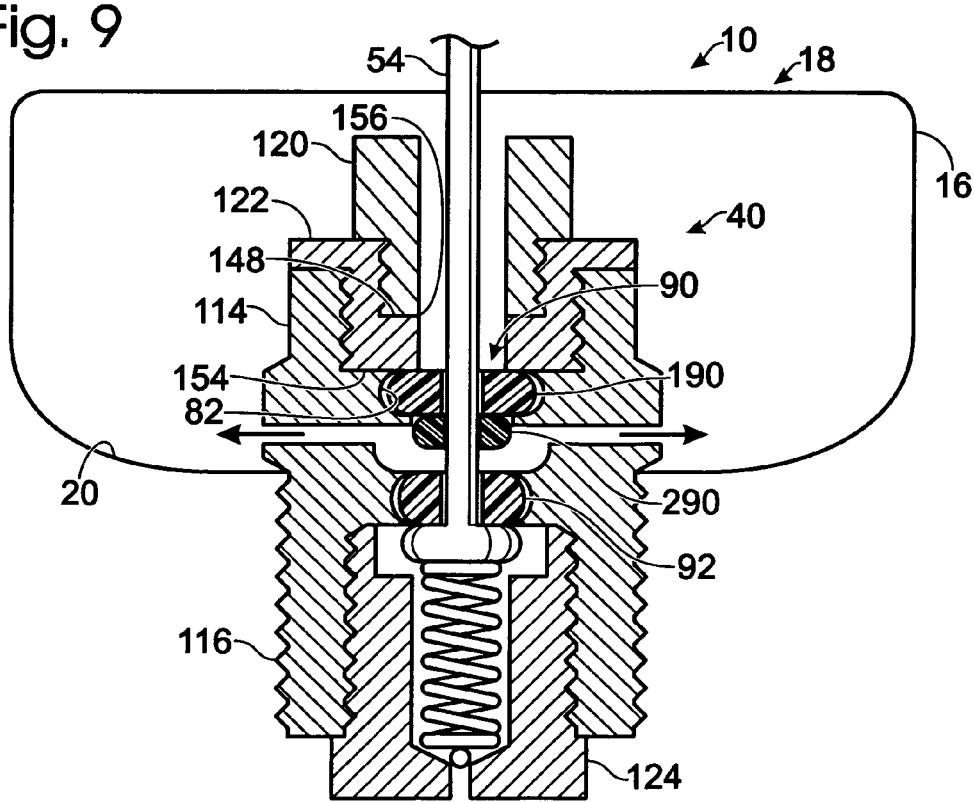
FIG. 9 is a cross-sectional side elevation view of an illustrative example of a suitable valve assembly for use in animal-activated feeding systems according to the present disclosure.

In FIG. 8 and many of the subsequently discussed figures, the vessel 16 has been schematically illustrated and is intended to indicate that the valve assemblies depicted therein may be installed for use with vessels 16 to provide feeding systems 10 according to the present disclosure. The particular shape and size of the vessels may vary from the schematic illustrations, such as discussed in more detail herein. Similarly, the length of the actuation member, including the degree to which it extends above the upper portion of the valve body, may vary within the scope of the present disclosure. For example, in some embodiments, it may be desirable for the activation member to extend a greater relative distance above the upper portion of the valve body than is illustrated in FIGS. 8-12. This is schematically illustrated in FIG. 9, in which the activation member is shown partially truncated to graphically depict that the length of this member may vary without departing from the scope of the present disclosure. It is also within the scope of the present disclosure that the activation member may include a shape other than the rod-like shape that is depicted in FIGS. 8-12. For example, in some embodiments, it may be desirable for an upper portion of the activation member, such as a portion that extends above the valve body, to have a greater cross-sectional area, or perimeter, than a corresponding portion that extends within the valve body. Increasing the size of the portion of the activation member that extends above the valve body may configure this portion for easier activation by an animal.

As discussed, valve assemblies 18 according to the present disclosure include a valve body 40. In the illustrative examples shown in FIGS. 8-12, the valve body includes structural elements, including an upper portion 114 and a lower portion 116, which may be formed as a single continuous element, or otherwise fixedly attached to one another. Regardless of whether the upper and lower portions are formed as, or function as, a single continuous element, the valve body is adapted to define a fluid conduit, or flow path, for the liquid feed that passes through the valve assembly. As indicated in at least FIG. 8, upper portion 114 may define an upper cavity 112 through which activation member 54 extends. Valve body 40 further includes, but is not necessarily required to include, a restriction member 119, a first sealing mechanism retainer 122, and an inlet cavity defining portion 124. In the depicted illustrative embodiments, restriction member 119 threads, or screws, into first sealing mechanism retainer 122, which threads into upper portion 114, and that inlet cavity defining portion 124 threads into lower portion 116, which may thread into a suitable structural element 130 of vessel 16, or other suitable structure, such as may be integral to feed supply line 128. It is within the scope of the present disclosure however, that other methods of integrating the various structural elements of valve body 40 may be employed. For example, some or all of the structural elements may be adapted to be press-fit, glued, soldered, welded, or any other suitable method, together.

Figure 10:
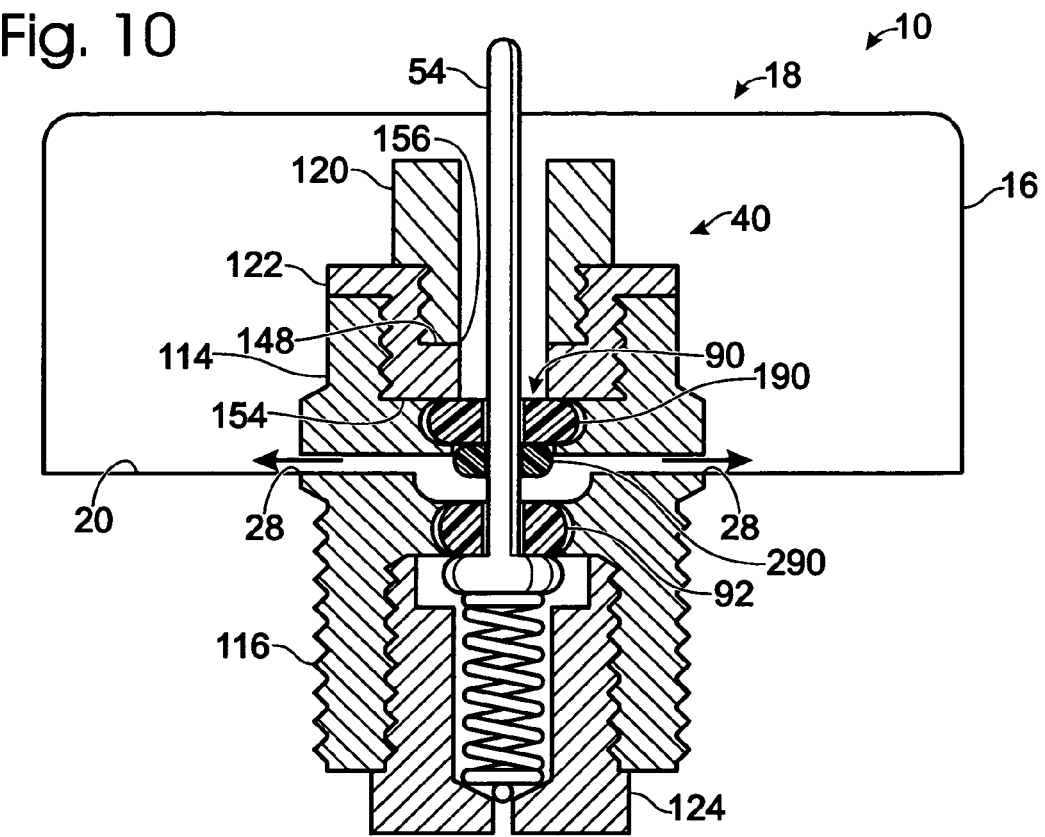
FIG. 10 is a cross-sectional side elevation view of another illustrative example of a suitable valve assembly for use in animal-activated feeding systems according to the present disclosure.
Figure 11:
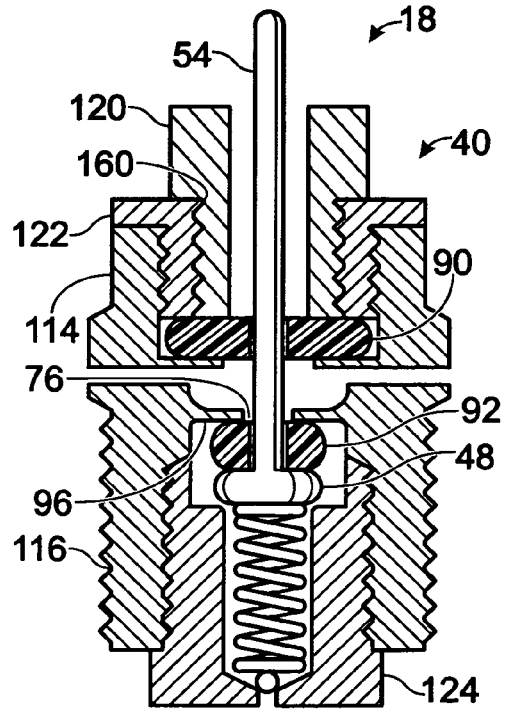
FIG. 11 is a cross-sectional side elevation view of another illustrative example of a suitable valve assembly for use in animal-activated feeding systems according to the present disclosure.
Figure 12:
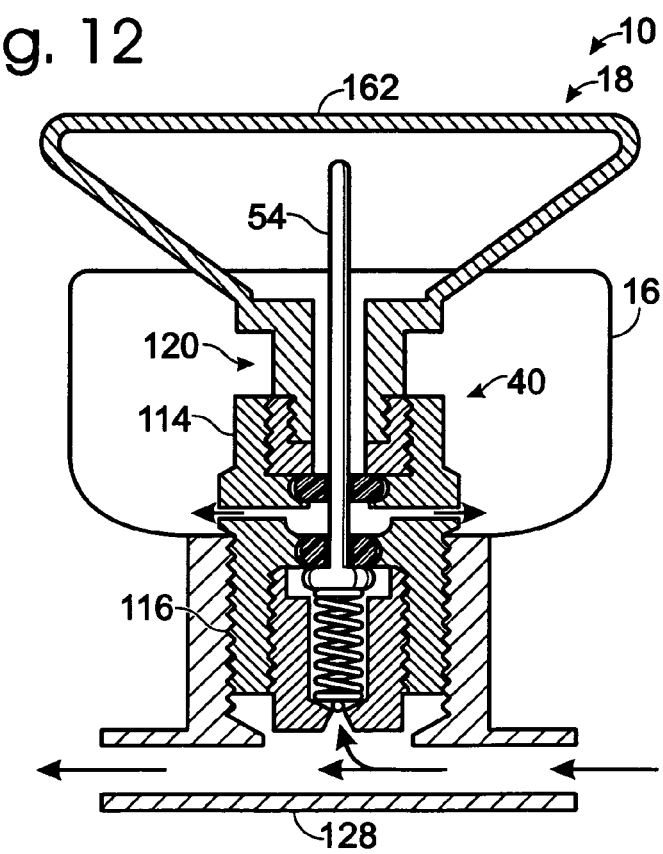
FIG. 12 is a cross-sectional side elevation view of another illustrative example of a suitable valve assembly for use in animal-activated feeding systems according to the present disclosure.

In the illustrative examples shown in FIGS. 8-12, and as indicated in at least FIG. 8, valve assembly 18 includes a bias member 98 in the illustrative, non-exclusive form of a compression spring, or spring element, 198. Spring 198 is present between lower surface 64 of valve member 48 and inlet 32. Valve assembly 18 further includes examples of a first sealing mechanism 90 and a second sealing mechanism 92. In the embodiments of FIGS. 9-10 and 12, second sealing mechanism 92 is recessed within first passage 76 of valve body 40. In all the depicted embodiments, second sealing mechanism 92 may be of any suitable material, for example rubber, such that when valve assembly 18 is in sealed configuration 118, feed flow path 42 is generally obstructed.

As discussed, valve assemblies 18 also include a valve member 48 and an associated activation member 54. In the illustrative example, valve member 48 may be generally disc-shaped and is configured to seat upon or otherwise sealingly engage the inlet cavity side of second sealing mechanism 92, thereby generally obstructing the feed flow path when the activation member is in the sealed position. In FIG. 8, activation member 54 takes the illustrative, non-exclusive form of an elongate cylindrical member that is fixedly attached to the second passage-side of, and coaxial to, valve member 48. Activation member 54 extends upward through outlet cavity 74 and through first sealing mechanism 90 and generally away from bottom surface 20 of vessel 16. Activation member 54 is adapted to be selectively pivotally positioned between at least a sealed position and a range of activated positions. Spring 198 may be retained within inlet cavity 72 such that spring 198 biases valve member 48 toward second sealing mechanism 92, thereby biasing activation member 54 to a sealed position, and accordingly biasing valve assembly 18 to sealed configuration 118. When valve assembly 18 is in a sealed configuration 118, activation member 54 is positioned in the sealed position, where it is configured to prevent feed from passing valve member 48. When valve assembly 18 is in the dispensing configuration, activation member 54 is positioned within the range of activated positions.

As indicated in FIG. 8, the depicted embodiments of FIGS. 8-12 also include an optional check valve 44 in the form of a back-flow preventing plug 140 that is situated generally atop inlet 32 formed within inlet cavity defining portion 124. The back-flow preventing plug serves to prevent feed from passing from inlet cavity 72 back into an associated feed line 128, thereby preventing contamination of feed source 14. Plug 140 may be a generally spherical, or other appropriate shape, structure with an outside dimension larger than that of inlet 32. Plug 140 may thus be adapted to generally block inlet 32 when a pressure 142 within feed line 128 is not great enough to overcome the weight of plug 140. When the pressure 142 of feed 12 within feed line 128 is great enough to overcome the weight of plug 140, plug 140 is adapted to rise within inlet cavity 72, such that feed 12 may freely flow from feed line 128 through inlet 32 and into inlet cavity 72. In some embodiments, spring 198 may be (but is not required to be) adapted to exert a downward force on plug 140, such that the pressure 142 within feed line 128 must be great enough to overcome both the weight of plug 140 and the force of spring 198. The presence of the plug 140 may prevent feed, (for instance, after sitting in a vessel long enough so that solids within the feed separate out and accumulate at the bottom of the vessel, thereby often becoming waste) from flowing back into the feed supply line 128 if the feed source happens to lose pressure. This may be useful to prevent possible contamination of the feed source.

As discussed, the illustrative embodiments depicted in FIG. 8-12 include a restriction member 119. Restriction member 119 may be configured to be selectively attached to first sealing mechanism retainer 122, or other suitable valve body structural component as may be appropriate in embodiments within the present disclosure. Restriction member 119 may be in the form of a pivot restrictor 120, which may be adapted to generally restrict actuation of activation member 54 thereby limiting the maximum pivotal motion of activation member 54 to a position within the range of activation positions that is closer to the sealed position than would otherwise be possible without attachment of the pivot restrictor. As such, the range of activation positions may include a first range 158 and a second range 258. In the second range, the activation member may be configured to allow greater feed flow than in the first range and the pivot restrictor may be adapted to restrict actuation of the activation member to within the first range, as shown in FIG. 8.

Stated in slightly different terms, pivot restrictor 120 may be put into place for the purpose of restricting the allowed motion of the activation member, so as to limit motion of the activation member, and thus the valve member, and therefore limit the resulting fluid flow. Where an internal diameter, or dimension, 144 of pivot restrictor 120, is of a size to provide a snug fit, or narrow gap, around activation member 54, for instance, the fluid flow control operation of the disclosed system may be prevented entirely.

Various embodiments of pivot restrictor 120 may be provided with a given embodiment of system 10. As such, a user of system 10 may selectively restrict activation member 54 to various levels of restriction as the user deems appropriate based on such factors as playfulness of the animals, age of the animals, type of animals, etc. In some embodiments, pivot restrictor 120 may completely prevent actuation of activation member 54, thereby enabling a user to effectively disable a system 10. For example, pivot restrictor 120 may be dimensioned such that when installed, pivot restrictor 120 extends the full length of the exposed portion of activation member 54, such that an animal is prevented from engaging activation member 54. In other embodiments, pivot restrictor 120 may extend beyond the exposed portion of activation member 54 and be closed on an upper end, such that activation member 54 is fully retained within pivot restrictor 120 and valve body 40. In yet other embodiments, regardless of the length of the exposed portion of activation member 54 that pivot restrictor 120 may extend, the internal dimension of pivot restrictor 120 may be sized so as to prevent, or at least greatly restrict, any pivoting of activation member 54.

As discussed, the pivot restrictor may be coupled to the valve body, such as the upper portion 114 thereof, by any suitable mechanism, including removable fastening mechanisms and permanent fastening mechanisms. In some embodiments, the upper portion of the valve body may provide a base, or mount, that is adapted to receive the pivot restrictor. Illustrative, non-exclusive examples of suitable fastening mechanisms include a threaded coupling, a press fit coupling, a pin-and-slot coupling, welding, brazing, etc. In some embodiments, a feeding system or valve assembly may be provided with a plurality of interchangeable pivot restrictors and/or the subsequently discussed feeder guards. Such an embodiment, which may be referred to as a kit, may permit users to selectively configure the range, or degree, of restriction provided by a particular valve assembly, such as responsive to the type of animal to be fed, the size and/or age of the animal to be fed by the system, the number of animals to be fed by the system, the type of feed to be used, the desired flow rate of feed from the valve assembly, user preferences, etc.

Referring now to FIG. 8, first sealing mechanism 90 may be recessed within valve body 40 at second passage 82, such that lower surface 94 of first sealing mechanism 90 defines upper extent 88 of outlet cavity 74 and is configured to generally direct, or deflect, the feed flow path laterally along outlet path or paths 30 and out of outlet or outlets 28 into vessel 16. First sealing mechanism 90 may be generally held in place between first sealing mechanism retainer 122 and a lip 146 integral to first diameter reducing restriction, or second passage 82. First sealing mechanism 90 may be of any suitable material, such that whether activation member 54 is actuated or not, first sealing mechanism 90 generally prevents, or at least greatly obstructs, the flow of feed from passing first sealing mechanism 90. Therefore, when valve assembly 18 is in the dispensing configuration, feed 12 will eject laterally through outlets 28 rather than vertically though second passage 82 and generally along activation member 54.

Turning now to FIG. 9, another illustrative, non-exclusive embodiment of system 10 is depicted. In FIG. 9, first sealing mechanism 90 includes an upper seal 190 and a lower seal 290. Upper seal 190 may be recessed within valve body 40, at second passage 82. Lower seal 290 is depicted generally in the form of an o-ring and is adapted to further prevent, or at least greatly obstruct, the flow of feed from passing first sealing mechanism 90. As such, lower seal 290 is attached to activation member 54, such that when activation member 54 is actuated, lower seal 290 moves with activation member 54. Therefore, if the material properties of upper seal 190 are such that a gap may form between upper seal 190 and activation member 54 when activation member 54 is actuated (similar to the operation of second sealing mechanism 92), then lower seal 290 acts to obstruct such a gap, thereby preventing, or at least greatly obstructing, the flow of feed from passing through first sealing mechanism 90.

FIG. 10 graphically illustrates another illustrative, non-exclusive embodiment of a system 10 according to the present disclosure. As shown, valve assembly 18 is situated within vessel 16 such that outlets 28 generally align with bottom surface 20. This configuration may aid in the agitation of dispensed feed, and thus may further aid in preventing solids, or sludge, from settling out of the feed.

Turning now to FIG. 11, another illustrative, non-exclusive embodiment of a system 10 according to the present disclosure is shown. The embodiment of FIG. 11 includes examples of variations on valve body structural elements upper portion 114, pivot restrictor 120, and first sealing mechanism retainer 122, and on first sealing mechanism 90, in order to provide a greater second range of activation positions than the embodiments of FIGS. 8-10 and 12 provide, when pivot restrictor 120 is selectively removed. As shown in at least FIGS. 8-10, first sealing mechanism retainer 122 includes a ledge 148 which projects radially inward and provides a lower surface 154 which physically retains first sealing mechanism 90 therebelow. As such, and as indicated in FIG. 9, an upper inside corner 156 of ledge 148 defines the maximum extent activation member 54 may pivot, thus limiting the second range of activation positions. In contrast, the first sealing mechanism retainer 122 of the embodiment of FIG. 11 does not include ledge 148. Therefore, the maximum extent activation member 54 may pivot, and thus the second range of activation positions, is limited by an upper inside corner 160 of first sealing mechanism retainer 122. Due to the lack of ledge 148 on first sealing mechanism retainer 122 in the embodiment of FIG. 11, upper portion 114 of valve body 40 must therefore be adapted to accept a wider first sealing mechanism 90, such that first sealing mechanism retainer 122 may operatively and functionally retain first sealing mechanism 90 within valve body 40. Though the embodiment of FIG. 11 is depicted with first sealing mechanism comprising only a single member, it is within the present disclosure that that such an embodiment, with the valve body structure discussed, may include an upper seal and a lower seal as discussed in relation to FIG. 9, or any other functionally suitable sealing mechanism.

Still referring to FIG. 11, the embodiment depicted includes another example of a suitable configuration of lower portion 116 of valve body 40. As shown, second sealing mechanism 92, rather than being retained within first passage 76 as in the embodiments of FIGS. 8-10 and 12, is retained between valve member 48 and the inlet cavity-side surface 96 generally encircling first passage 76.

Figure 13:
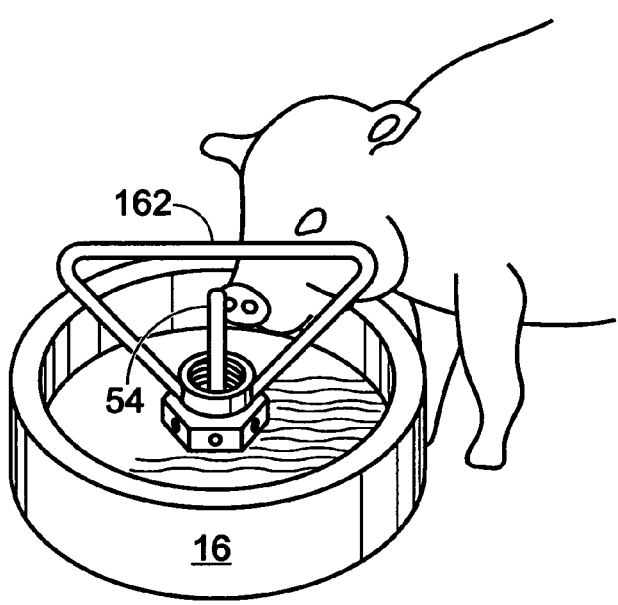
FIG. 13 is an illustration of an animal-activated feeding system with a feeder guard according to the present disclosure.
Figure 14:
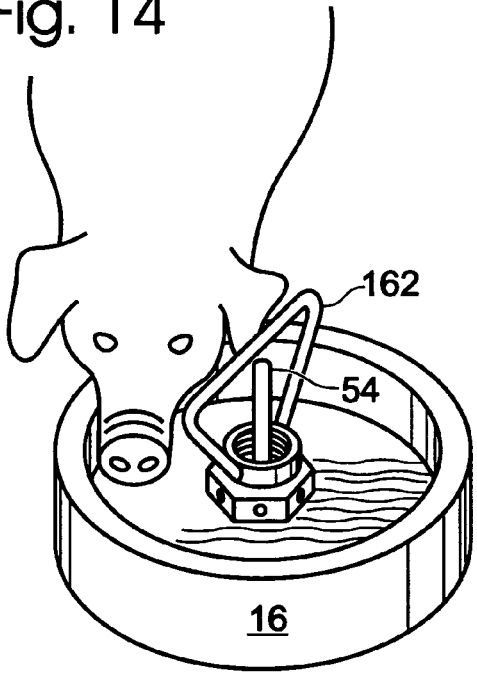
FIG. 14 is another illustration of an animal-activated feeding system with a feeder guard according to the present disclosure.

FIG. 12 graphically illustrates another illustrative, non-exclusive embodiment of a system 10 according to the present disclosure. FIG. 12 illustrates that systems 10 according to the present disclosure may, but are not required to, include a pivot restrictor 120 that includes a feeder guard, or restriction extension, 162. Feeder guard 162 may additionally or alternatively be described as being a restriction element or restriction element frame. Feeder guard 162 may, but is not required in all embodiments to, serve two general functions. First, feeder guard 162 may perform the same function as the previously discussed pivot restrictor embodiments, such as to restrict actuation of activation member 54 to within a first range of activation positions. Second, feeder guard 162 may be adapted to restrict an animal's access to activation member 54. For example, for use with piglets, feeder guard 162 restricts, or at least discourages, a piglet's ability to actuate the activation member with the side of its head or snout while continuing to consume feed within the vessel. When the feeder guard is installed, a piglet is forced to actuate the activation member with its snout, thereby generally preventing, or at least greatly restricting, the piglet from being able to simultaneously consume feed within the vessel and actuate the activation member. FIGS. 13 and 14 graphically illustrate first a piglet in a position to actuate activation member 54 with its snout, and second a piglet consuming feed and thus being restricted from easily actuating activation member 54 with the side of its head or snout, respectively.

Feeder guard 162 may be described as being within a plane which generally bisects the vessel, when the vessel is a cup or other vessel with general radial symmetry, and may further be described as generally encircling, or surrounding, activation member 54. Though shown configured in a generally triangular shape, any functionally suitable shaped feeder guard 162 may be utilized in systems 10 (e.g., rectangular, square, diamond, oval, round, etc.) and is to be considered within the scope of the present disclosure. The feeder guard may define a plane within which the activation member extends. However, it is also within the scope of the present disclosure that the feeder guard and activation member may not be entirely contained within a single plane. As an illustrative, non-exclusive example, the activation member may define an axis that extends at an angle of ±15°, ±10°, or ±5° relative to a plane or surface defined by the feeder guard. Further, while shown as an extension of, or integral to, pivot restrictor 120, it is within the scope of the present disclosure that any functionally suitable mounting, or attachment, of feeder guard 162 to any suitable component of system 10, including but not limited to valve body 40 and/or vessel 16, may be used, such that animals may be generally restricted from actuating activation member 54 in a way so as to limit over-actuation. In the illustrated example, two or more animals may simultaneously access feed within the vessel when feeder guard 162 is installed; however, feeder guard 162 may realistically limit access to approximately two animals at a given time. The presence of feeder guard 162 may prevent, or at least greatly restrict, overworking of activation member 54 both by making its access more difficult, and by restricting access to only a few animals at a given time.

Figure 15:
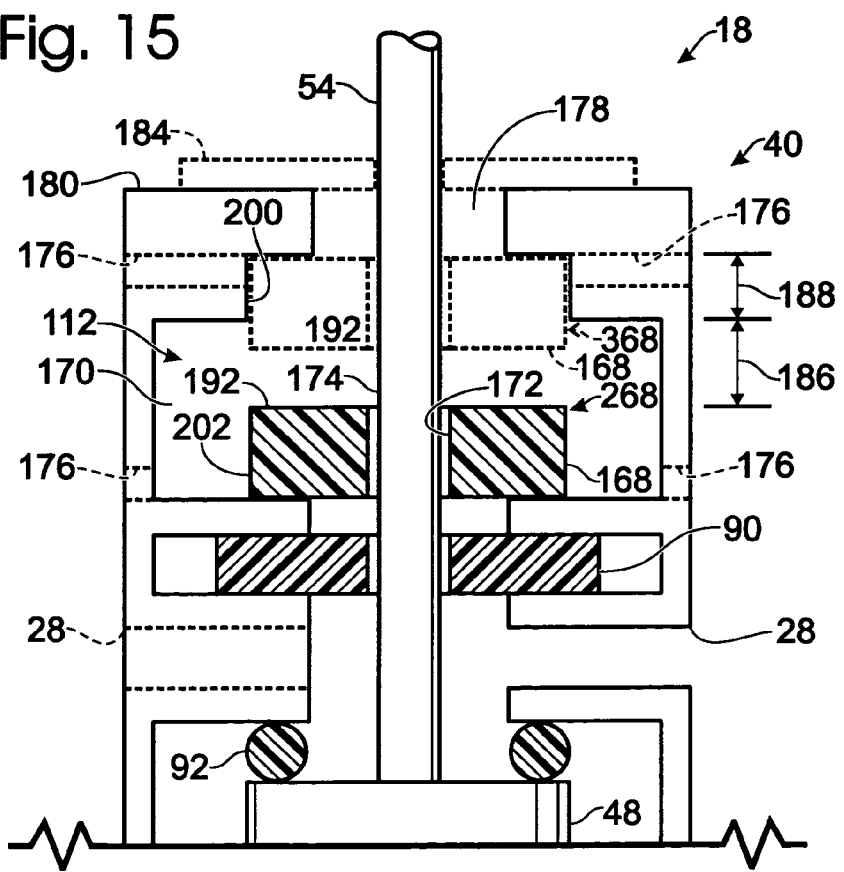
FIG. 15 is a schematic cross-sectional side elevation view of a suitable valve assembly including a buoyant activation restriction mechanism for use in animal-activated feeding systems according to the present disclosure.
Figure 16:
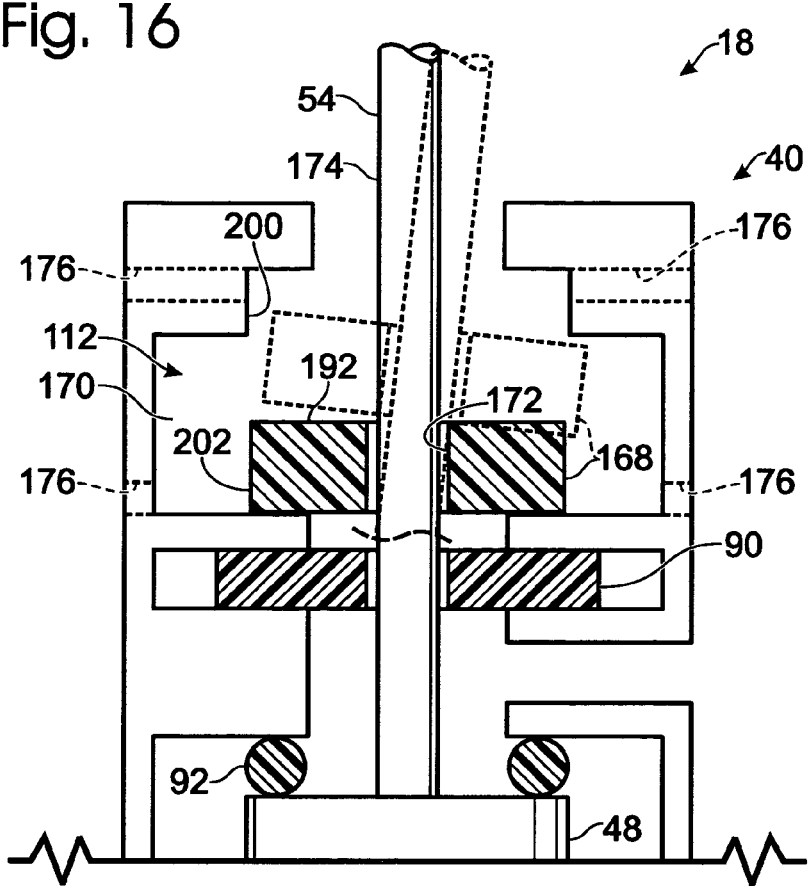
FIG. 16 is another schematic cross-sectional side elevation view of the valve assembly of FIG. 15.

Turning now to FIGS. 15 and 16, schematic cross-sectional side views of suitable valve assemblies 18 are shown including buoyant activation restriction mechanisms, or floats, 168. Valve body 40 may include upper cavity 112 in the form of a float chamber, or annular space, 170, which is configured to retain restriction mechanism 168 within valve body 40. Restriction mechanism 168 is configured to be slidingly coupled to activation member 54. Restriction mechanism 168 may thus have a bore 172 configured to slidingly engage an outer surface 174 of activation member 54. Valve body 40 may, but is not required to, include one or more conduits, or fluid entry/exit means, 176, fluidly connecting float chamber 170 with vessel 16, such that as the feed level rises and lowers within the vessel, feed may enter and exit float chamber 170 via conduits 176. Conduits 176 may be positioned in any functionally suitable position such that feed may operatively enter and exit float chamber 170, as indicated in FIGS. 15 and 16. In embodiments where valve body 40 does not include conduits 176, the level of feed within the vessel must generally rise to a level greater than a top surface 180 of valve body 40, and enter through a third passage 178 in order for feed to enter float chamber 170. In embodiments where valve body 40 does include conduits 176, valve assembly 18 may additionally include a top cover 184 adapted to generally prevent, or at least greatly restrict, feed or other contaminants or debris from entering float chamber 170 via third passage 178. Top cover 184 may be generally described as being a flat washer with an inner diameter, or dimension, generally equal to the outer diameter, or dimension, of the activation member, and an outer diameter wide enough to cover third passage 178 irrelevant of whether the activation member is in the sealed position or within the range of activated positions. Top cover 184 may thus generally prevent dirt, feed particles or solids, or other debris from entering float chamber 170 and obstructing the function of restriction mechanism 168.

As the name implies, buoyant activation restriction mechanisms 168 according to the present disclosure are adapted to be buoyant in the particular liquid feed with which the corresponding feeding system 10 is utilized. Accordingly, the restriction mechanism may be adapted to have a specific gravity that is less than the specific gravity of the feed with which the specific feeding system is utilized. In some embodiments, the restriction mechanism may have a specific gravity that is at least 10% less than, at least 20% less than, at least 50% less than, 5-50% less than, at least 75% less than, and/or 25-75% less than the specific gravity of the corresponding liquid feed. However, the above illustrative examples are not intended to be an exclusive set of examples, and it is within the scope of the present disclosure that restriction mechanisms 168 according to the present disclosure may have other specific gravities and/or relative buoyancies with respect to the liquid feed used in a particular feeding system.

Restriction mechanism 168 is adapted to be selectively positioned between a range of neutral positions 186 and a range of engagement positions 188. In FIG. 15, restriction mechanism 168 is depicted within the range of neutral positions at 268 in solid lines, and within the range of engagement positions, or in a fully engaged position, at 368, in dashed lines. In FIG. 16, activation member and restriction mechanism 168 are depicted in solid lines with activation member 54 in the sealed position, and in dashed lines with activation member 54 within the range of activated positions and restriction mechanism 168 within the range of neutral positions. In the range of neutral positions, the restriction mechanism is adapted to permit activation, including further activation, of the activation member. In the range of engagement positions, the restriction mechanism is adapted to restrict actuation of the activation member. This restriction of the actuation of the activation member may include at least one of further displacement of the activation member away from its sealed position(s) and/or subsequent activation of the activation member.

As depicted in the illustrative, non-exclusive example shown in FIG. 15, ranges 186 and 188 correspond to the position of a top surface 192 of restriction mechanism 168, although it is within the scope of the present disclosure that these positions may additionally or alternatively be defined at least in part by other portions of the restriction mechanism. Restriction mechanism 168 is configured to be urged away from the valve member in response to higher levels of feed in the vessel. In other words, as the level of liquid feed in the vessel rises and enters float chamber 170, the buoyancy of the restriction mechanism urges the restriction mechanism to also rise with the level of liquid feed. As discussed, the restriction mechanism is slidingly coupled (i.e., configured for relative sliding or translational movement) to the activation member. As the level of liquid feed in the vessel increases, the restriction mechanism is adapted to slide along, or otherwise relative to, the activation member, generally away from the valve member along the activation member and/or generally toward the range of engagement positions relative to the range of neutral positions. When the level of feed decreases, the restriction mechanism is similarly adapted to slide along, or relative to, the activation member generally toward the valve member (and/or toward the range of neutral positions relative to the range of engagement positions).

In some embodiments of systems 10 according to the present disclosure, valve body 40 may include a restriction mechanism engagement region 200, and the restriction mechanism may include a corresponding valve body engagement region 202 that is configured to engage the restriction mechanism engagement region when the restriction mechanism is positioned in range of engagement positions 188. As schematically shown in FIGS. 15 and 16, the restriction mechanism is adapted to slide along activation member 54 generally away from and generally toward valve member 48. The restriction mechanism may be described as being closer to the valve member in the range of neutral positions, as shown in solid lines, than in the range of engagement positions In some embodiments, the forces exerted by the animal, such as to the activation member, may at least temporarily restrict the restriction mechanism from sliding along, or relative to, the activation member until these forces are reduced or interrupted. As an illustrative example, in some embodiments, the buoyancy of the restriction mechanism and the level of feed within the corresponding vessel may urge the restriction mechanism away from the valve member. However, this movement may be restricted or otherwise prevented by contact between the restriction mechanism and the inside surface of the float chamber. However, when the animal actuation is interrupted and/or the forces induced thereby are sufficiently reduced, the buoyant activation restriction mechanism may then adjust its relative orientation responsive to the level of feed in the float chamber. Further and/or subsequent activation of the valve assembly may thereafter be limited or completely restricted by the restriction mechanism, at least until the level of liquid feed in the vessel is sufficiently reduced.

Stated alternatively, the annular space between the nipple housing and the rod means therewithin is smaller at its top than it is therebeneath, and the annular space has the float therewithin such that if fluid accumulates within the vessel and annular space, the float rises in the annular space and serves to automatically restrict possible rod means motion. When fluid level lowers, the float lowers and increased rod means motion is again possible.

Any functional shape of restriction mechanism and float chamber combination is within the scope of the present disclosure. When the restriction mechanism is unelevated, or not within the range of engagement positions, it may have negligible effect on the activation member motion, but as it rises within float chamber 170 its size and/or shape may cause it to restrict possible activation member motion.

Figure 17:
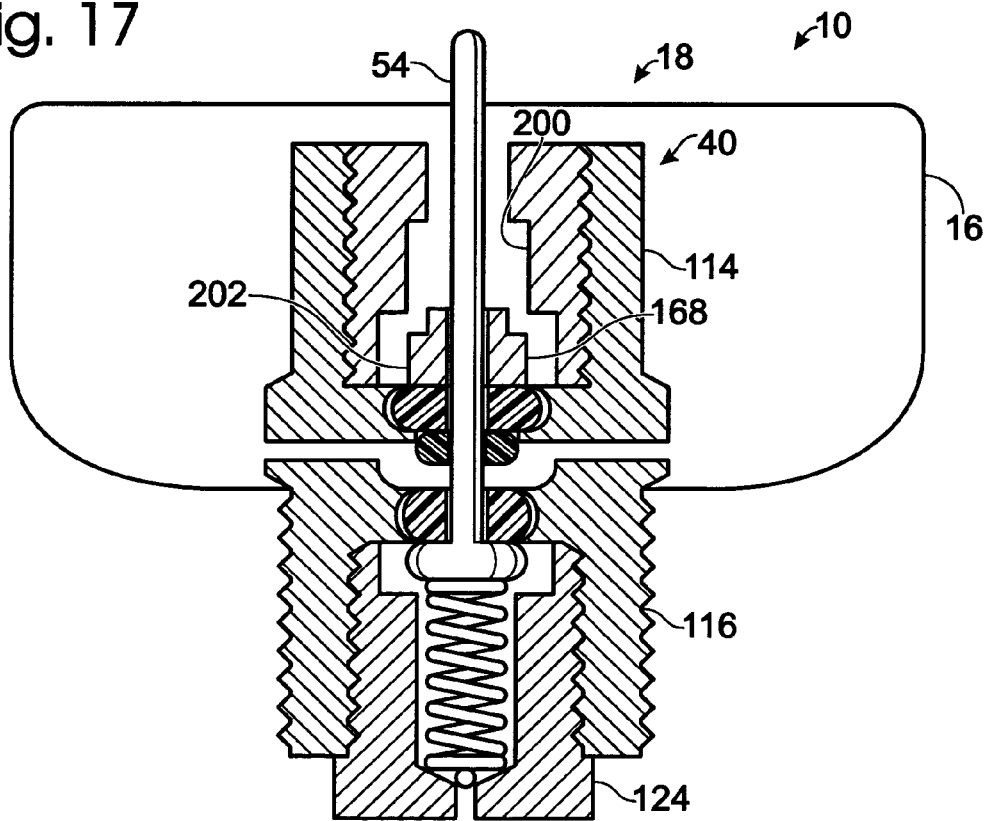
FIG. 17 is a cross-sectional side elevation view of an illustrative example of a suitable valve assembly for use in animal-activated feeding systems according to the present disclosure.
Figure 18:
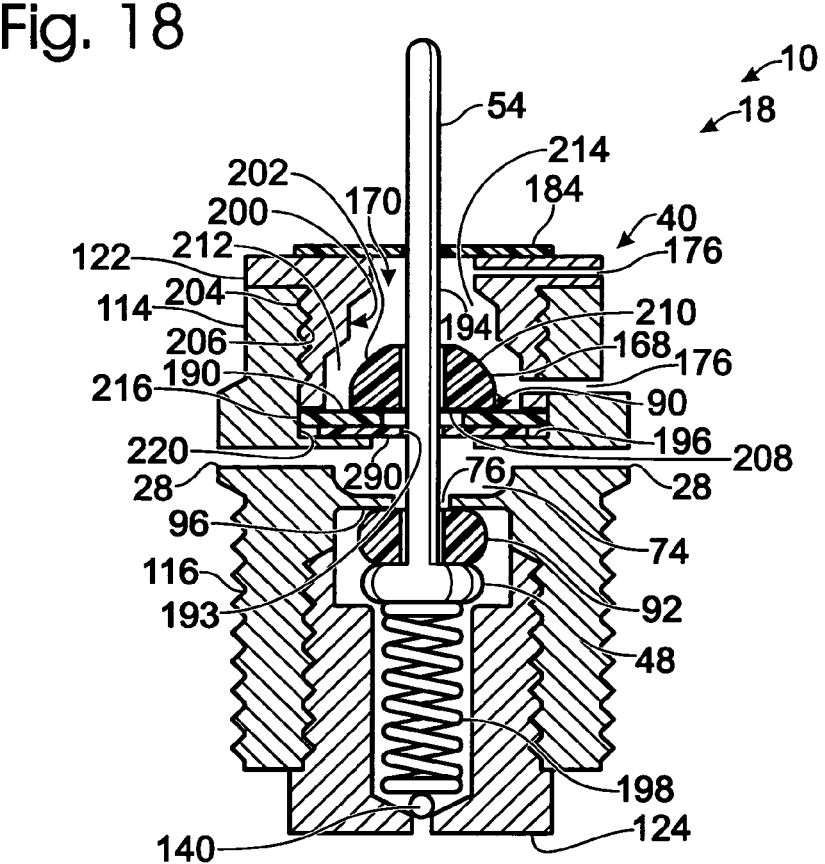
FIG. 18 is a cross-sectional side elevation view of another illustrative example of a suitable valve assembly for use in animal-activated feeding systems according to the present disclosure.
Figure 19:
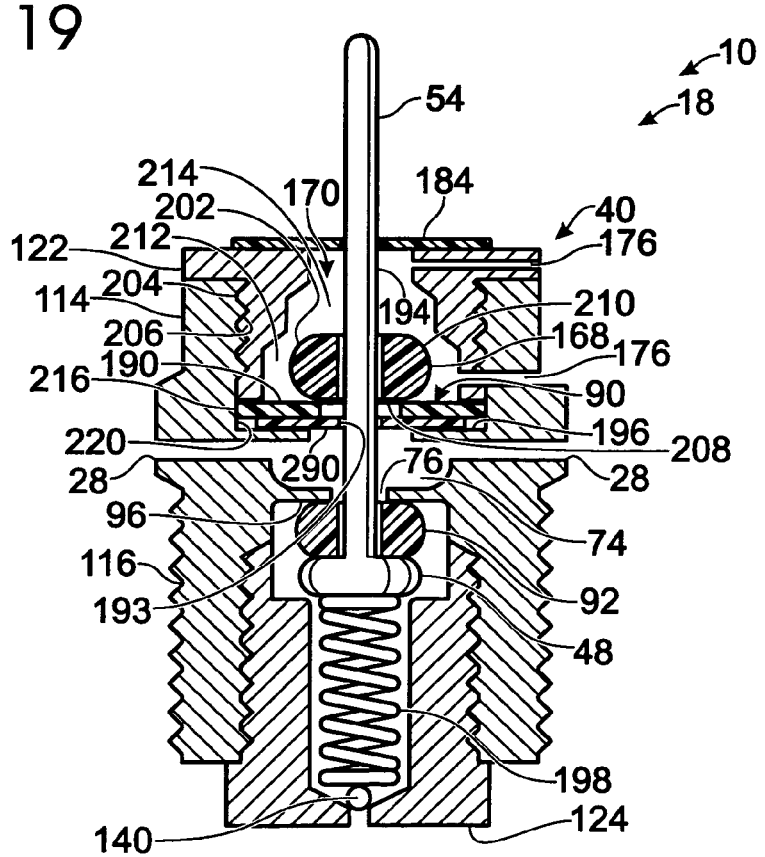
FIG. 19 is a cross-sectional side elevation view of another illustrative example of a suitable valve assembly for use in animal-activated feeding systems according to the present disclosure.

Three illustrative, non-exclusive examples of valve assembly 18 incorporating buoyant activation restriction mechanisms 168 are depicted in FIGS. 17-19. As shown in at least FIG. 19, valve body 40 includes first sealing mechanism retainer 122, upper portion 114, lower portion 116, and inlet cavity defining portion 124. Valve body 40 further includes outlets 28 configured to provide lateral ejection of feed into a vessel, and conduits 176 configured to permit fluid communication between the vessel and float chamber 170. Valve assembly 18 is depicted with spring 198, plug 140, first sealing mechanism 90, second sealing mechanism 92, and top cover 184. As discussed however, various embodiments of system 10 according to the present disclosure may incorporate various combinations and/or groupings of some or all of the described components and/or may include one or more additional components.

Second sealing mechanism 92 is depicted generally in the form of an o-ring and is retained between valve member 48 and the inlet cavity-side surface 96 generally encircling first passage 76. First sealing mechanism 90 includes upper seal 190 and lower seal 290, both generally in the form of washers; however, any other suitable configuration of first sealing mechanism 90 adapted to generally prevent, or at least greatly obstruct, the flow of feed from outlet cavity 74 to float chamber 170, is within the present disclosure. As depicted, upper seal 190 has an outer diameter, or dimension, approximately equal to the inner diameter, or dimension, of upper portion 114, and an inner diameter, or dimension, greater than the outer diameter of activation member 54, such that upper seal 190 is adapted to permit activation member 54 to be actuated fully within the range of activated positions. Lower seal 290, also generally in the form of a washer, has an inner diameter, or dimension, approximately equal to the outer diameter, or dimension, of activation member 54, and an outer diameter, or dimension, less than the inner diameter, or dimension, of upper portion 114, such that lower seal 290 is also adapted to permit activation member 54 to be actuated fully within the range of activated positions. Stated in slightly different terms, lower seal 290 may include an inside peripheral surface 193 generally surrounding and conforming to a peripheral surface 194 of activation member 54, such that lower seal 290 is adapted to engage a lower surface 196 of float chamber 170, proximal to valve member 48. Thus lower seal 290 is configured to permit actuation of the activation member into the range of activation positions. Furthermore, upper seal 190 may be distal to the valve member from the lower seal and may include an outside peripheral surface 216 generally conforming to an inside peripheral surface 220 of upper portion 114, and may be configured to permit actuation of the activation member into the range of activated positions.

As shown, first sealing mechanism retainer 122 is adapted to fixedly attach to upper portion 114 of valve body 40, such that first sealing mechanism retainer 122 generally retains first sealing mechanism 90 within valve body 40. First sealing mechanism retainer 122 is depicted with external threads 204 adapted to mate with corresponding internal threads 206 of upper portion 114; however, as discussed, it is within the present disclosure that any other functionally suitable method of attaching first sealing mechanism retainer 122 to upper portion 114 may be employed including, but not limited to, press-fitting, gluing, welding, soldering, etc.

As shown, restriction mechanisms 168 and float chambers 170 may take a variety of functionally suitable configurations. The restriction mechanism of the embodiment depicted in FIG. 18 includes a bottom surface 208 that is generally flat, and a top surface 210 that is generally rounded and that defines valve body engagement region 202. The restriction mechanism of the embodiment depicted in FIG. 19 includes a generally rounded bottom surface 208 and a generally rounded top surface 210 that defines valve body engagement region 202. The float chamber of the embodiments depicted in FIGS. 17-19 include a wider lower portion 212 and a narrower upper portion 214 distal to the valve member from the wider lower portion. Narrower upper portion 214 has a peripheral surface 222 defining restriction mechanism engagement region 200. Restriction mechanism 168 and float chamber 170 are thus adapted to permit actuation of activation member 54 when restriction mechanism 168 is in the range of neutral positions, and further adapted to permit restriction of actuation of activation member 54 when restriction mechanism 168 is within the range of engagement positions.

Therefore, as an animal actuates activation member 54 from the sealed position to the range of activated positions, restriction mechanism 168 will shift generally laterally with the pivoting motion of activation member 54; valve member 48 will unseat from second sealing mechanism 92 against the biasing force of spring 198; the pressure of the feed from the feed source will cause feed to enter inlet 32, overcoming the weight of plug 140, to pass through first passage 76 into outlet cavity 74, and then to eject laterally through outlets 28. Subsequently, as an animal actuates activation member 54 enough to raise the level of feed within the vessel such that feed enters conduits 176, the buoyancy of restriction mechanism 168 will cause restriction mechanism 168 to slide along activation member 54 generally away from valve member 48. Then, if the feed level continues to rise, restriction mechanism 168 may enter the range of engagement positions, causing valve body engagement region 202 to engage restriction mechanism engagement region 200, and thus prevent further actuation of activation member 54. Finally, as an animal or animals consume(s) feed within the vessel, and the level of feed lowers past the vertical location of conduits 176, feed within the float chamber will drain therefrom, causing valve body engagement region 202 to disengage restriction mechanism engagement region 200 as restriction mechanism 168 lowers with the feed level within float chamber 170, and thus enables further actuation of activation member 54.

Industrial Applicability

The animal-activating feeding systems and methods of the present disclosure have industrial applicability in the animal-feeding and livestock industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

I claim:

1. An animal-activated feeding system for dispensing a liquid feed to a vessel, the feeding system comprising:
    a self-sealing valve assembly adapted to deliver a flow of the liquid feed and further adapted to be selectively configured between at least a sealed configuration and a dispensing configuration, wherein the valve assembly is biased to the sealed configuration and comprises:
    a valve body defining a feed flow path including an outlet flow path, wherein the valve body comprises
        an outlet defining the outlet flow path and configured to dispense the feed into the vessel;
    a valve member configured to selectively obstruct the feed flow path; and
    a feed-flow activation member coupled to the valve member, upwardly extending generally away from the valve body, and configured to be selectively positioned between a sealed position and a range of activated positions, wherein in the sealed configuration of the valve assembly, the activation member is positioned in the sealed position to prevent the flow of liquid feed from passing the valve member, wherein in the dispensing configuration of the valve assembly, the activation member is positioned within the range of activated positions to permit the flow of liquid feed to pass the valve member, and further wherein the feed-flow activation member has a central axis; and
    wherein the outlet flow path has a central axis within a plane generally perpendicular to the central axis of the activation member when the activation member is in the sealed position, and further wherein the outlet is adapted to dispense the feed in a discrete stream into the vessel.

2. The system of claim 1, wherein the valve body includes a plurality of spaced-apart outlets, and further wherein each outlet defines an outlet flow path and is configured to dispense feed into the vessel.

3. The system of claim 1, wherein the activation member is adapted to be pivoted between the sealed and activated positions.

4. The system of claim 3, wherein the activation member includes a portion that projects from the valve body, and further wherein the portion has an elongate, cylindrical configuration.

5. The system of claim 1, wherein the central axis of the outlet flow path intersects the central axis of the activation member when the activation member is in the sealed position.

6. The system of claim 1, wherein the central axis of the outlet flow path is generally offset from, and does not intersect, the central axis of the activation member when the activation member is in the sealed position.

7. The system of claim 6, in combination with a vessel to which the valve assembly is coupled, wherein the vessel includes a sidewall with an interior surface, and further wherein the outlet is adapted to direct the flow of feed at the interior surface at a generally non-normal angle.

8. The system of claim 1, wherein the outlet flow path is generally arcuate.

9. The system of claim 8, in combination with a vessel to which the valve assembly is coupled, wherein the vessel includes a sidewall with an interior surface, and further wherein the outlet flow path is adapted to direct the flow of feed at the interior surface at a generally non-normal angle.

10. The system of claim 1, wherein the valve body further comprises:
    an upper cavity through which the activation member extends, and
    an outlet cavity through which the activation member extends, adjacent the outlet, and proximal to the valve member from the upper cavity; and
    wherein the valve assembly further comprises a sealing mechanism adapted to restrict the flow of feed from passing from the outlet cavity to the upper cavity.

11. The system of claim 10, wherein the activation member includes a peripheral surface, wherein the upper cavity includes a lower surface proximal to the valve member and a peripheral surface, wherein the sealing mechanism includes a lower seal and an upper seal, wherein the lower seal engages the lower surface of the upper cavity and includes an inside peripheral surface generally surrounding and conforming to the peripheral surface of the activation member, wherein the lower seal is configured to permit actuation of the activation member into the range of activated positions, wherein the upper seal is distal to the valve member from the lower seal, and includes an outside peripheral surface generally conforming to the peripheral surface of the upper cavity, and further wherein the upper seal is configured to permit actuation of the activation member into the range of activated positions.

12. The system of claim 1, further comprising a restriction member adapted to be selectively installed and removed by a user, and further adapted to restrict actuation of the activation member.

13. The system of claim 12, wherein the range of activation positions includes a first range and a second range, wherein in the second range, the activation member is configured to allow greater feed flow than in the first range, and further wherein the restriction member is adapted to restrict activation of the activation member to within the first range.

14. The system of claim 13, wherein in the second range, the activation member is adapted to be pivoted a greater distance away from the sealed position than in the first range.

15. The system of claim 12, wherein the restriction member is further adapted to selectively prevent actuation of the activation member by an animal.

16. The system of claim 1, further comprising a feeder guard coupled to the valve body and configured to limit actuation of the activation member by an animal.

17. The system of claim 1,
wherein the valve body further comprises an inlet configured to receive the feed from a feed source; and
wherein the valve assembly further includes a check valve adapted to generally prevent the flow of feed from passing through the inlet toward the feed source.

18. The system of claim 1, wherein the system further comprises a buoyant activation restriction mechanism slidingly coupled relative to the activation member, and configured to be selectively positioned, in response to a level of the feed within the vessel, between a range of neutral positions and a range of engagement positions, wherein in the range of neutral positions, the restriction mechanism is adapted to permit activation of the activation member, wherein in the range of engagement positions, the restriction mechanism is distal to the valve member from the range of neutral positions and is adapted to restrict activation of the activation member, and further wherein the restriction mechanism is configured to be urged away from the valve member and toward the range of engagement positions in response to higher levels of feed in the vessel.

19. The system of claim 18, wherein the valve body includes a float chamber through which the activation member extends, wherein the float chamber is adapted to retain the buoyant activation restriction mechanism, and further wherein the float chamber includes an upper narrowed portion, distal to the valve member, with a peripheral surface adapted to engage the restriction mechanism when the restriction mechanism is within the range of engagement positions.

20. The system of claim 19, wherein the valve body further includes a conduit adapted to permit feed to enter and exit the float chamber, from and to the vessel, as the feed level rises and lowers within the vessel.

21. An animal-activated feeding system for dispensing a liquid feed to a vessel, the feeding system comprising:
a self-sealing valve assembly adapted to deliver a flow of the liquid feed and further adapted to be selectively configured between at least a sealed configuration and a dispensing configuration, wherein the valve assembly is biased to the sealed configuration and comprises:
a valve body defining a feed flow path including an outlet flow path, wherein the valve body comprises
an outlet defining the outlet flow path and configured to dispense the feed into the vessel;
a valve member configured to selectively obstruct the feed flow path; and
a feed-flow activation member coupled to the valve member, upwardly extending generally away from the valve body, and configured to be selectively positioned between a sealed position and a range of activated positions, wherein in the sealed configuration of the valve assembly, the activation member is positioned in the sealed position to prevent the flow of liquid feed from passing the valve member, and further wherein in the dispensing configuration of the valve assembly, the activation member is positioned within the range of activated positions to permit the flow of liquid feed to pass the valve member; and
a buoyant activation restriction mechanism slidingly coupled relative to the activation member, and configured to be selectively positioned, in response to a level of the 22. The system of claim 21, wherein the valve body includes a float chamber through which the activation member extends, wherein the float chamber is adapted to retain the buoyant activation restriction mechanism, and further wherein the float chamber includes an upper narrowed portion, distal to the valve member, with a peripheral surface adapted to engage the restriction mechanism when the restriction mechanism is within the range of engagement positions.

23. A laterally-ejecting fluid flow control system, the system comprising:
a nipple housing comprising:
a means for accepting fluid comprising a hole and configured to accept fluid along a substantially vertically oriented locus; and
a means for ejecting fluid comprising at least one laterally facing hole extending through the nipple housing and configured to laterally eject fluid to a vessel generally without a substantial upward or downward component;
a rod means positioned for providing fluid to the vessel such that the rod means projects substantially vertically upward out of the nipple housing, the rod means comprising:
a first portion with substantially one diameter over the majority of its length; and
a second portion with a substantially abrupt larger diameter near a lower region of the rod means configured to generally obstruct a fluid flow path, wherein the rod means is configured so that if forced to assume other than a nominal vertical orientation, the second portion permits the flow path to open and allow source fluid to flow past the second portion.

24. The system of claim 23, wherein the nipple housing further includes an annular space configured to accumulate fluid when the vessel accumulates fluid, and further wherein the system further includes a float positioned within the annular space and slidingly coupled to the first portion of the rod means and configured to rise with the fluid and restrict rod means motion and to lower with the fluid and allow rod means motion. feed within the vessel, between a range of neutral positions and a range of engagement positions, wherein in the range of neutral positions, the restriction mechanism is adapted to permit activation of the activation member, wherein in the range of engagement positions, the restriction mechanism is distal to the valve member from the range of neutral positions and is adapted to restrict activation of the activation member, and further wherein the restriction mechanism is configured to be urged away from the valve member and toward the range of engagement positions in response to higher levels of feed in the vessel.

* * * * *

UNITED STATES PATENT AND TRADEMARK OFFICE
CERTIFICATE OF CORRECTION

| | | |
|---|---|---|
| PATENT NO. | : 8,166,917 B2 | Page 1 of 1 |
| APPLICATION NO. | : 11/318279 | |
| DATED | : May 1, 2012 | |
| INVENTOR(S) | : Stephen B. Welbourne | |

It is certified that error appears in the above-identified patent and that said Letters Patent is hereby corrected as shown below:

Column 24, Line 11, after "level of the" please insert --feed within the vessel, between a range of neutral positions and a range of engagement positions, wherein in the range of neutral positions, the restriction mechanism is adapted to permit activation of the activation member, wherein in the range of engagement positions, the restriction mechanism is distal to the valve member from the range of neutral positions and is adapted to restrict activation of the activation member, and further wherein the restriction mechanism is configured to be urged away from the valve member and toward the range of engagement positions in response to higher levels of feed in the vessel.--

Column 24, Line 51, after "motion." please delete "feed within the vessel, between a range of neutral positions and a range of engagement positions, wherein in the range of neutral positions, the restriction mechanism is adapted to permit activation of the activation member, wherein in the range of engagement positions, the restriction mechanism is distal to the valve member from the range of neutral positions and is adapted to restrict activation of the activation member, and further wherein the restriction mechanism is configured to be urged away from the valve member and toward the range of engagement positions in response to higher levels of feed in the vessel."

Signed and Sealed this

Thirty-first Day of July, 2012

David J. Kappos
*Director of the United States Patent and Trademark Office*